(12) United States Patent
Nakano

(10) Patent No.: US 7,847,175 B2
(45) Date of Patent: Dec. 7, 2010

(54) MUSICAL SCORE RECOGNITION DEVICE AND COMPUTER PROGRAM THEREOF

(75) Inventor: Seiji Nakano, Shizuoka (JP)

(73) Assignee: Kabushiki Kaisha Kawai Gakki Seisakusho, Hamamatsu-shi (JP)

( * ) Notice: Subject to any disclaimer, the term of this patent is extended or adjusted under 35 U.S.C. 154(b) by 154 days.

(21) Appl. No.: 12/285,622

(22) Filed: Oct. 9, 2008

(65) Prior Publication Data

US 2009/0095144 A1 Apr. 16, 2009

(30) Foreign Application Priority Data

Oct. 12, 2007 (JP) ............................. 2007-266448

(51) Int. Cl.
*G10H 1/18* (2006.01)
(52) U.S. Cl. ........................................ 84/616
(58) Field of Classification Search .................. 84/616, 84/483.2
See application file for complete search history.

(56) References Cited

U.S. PATENT DOCUMENTS

2004/0074376 A1* 4/2004 Varme ....................... 84/483.2

2005/0081702 A1* 4/2005 Jung ............................ 84/616

FOREIGN PATENT DOCUMENTS

JP 09-097058 A 4/1997

* cited by examiner

*Primary Examiner*—Jianchun Qin
(74) *Attorney, Agent, or Firm*—Birch, Stewart, Kolasch & Birch, LLP

(57) ABSTRACT

The part template including information that is necessary to set after the image of the musical score read out by the scanner is recognized, is stored beforehand, and the part template corresponding to the read out musical score by the scanner is selected from a plurality of the part templates. And then, with the selected part template, setting (correcting) is to be performed automatically for the musical score read out by the scanner. Accordingly, it is possible to make the settings, which the user performs after a musical score is recognized, fewer than conventionally, and it is possible to increase the recognition rate of the musical score higher than conventionally.

11 Claims, 16 Drawing Sheets

301

| TEMPLATE NAME | ~302 |
| --- | --- |
| PART NAME | ~303 |
| PART NAME ABBREVIATION | ~304 |
| TRANSPOSITION MUSICAL INSTRUMENT SETTING | ~305 |
| CLEF | ~306 |
| NUMBER OF TABLATURE STAFF | ~307 |
| TABLATURE TUNING INFORMATION | ~308 |

| CATEGORY | MUSICAL INSTRUMENT ID |  |  |  |  |  |
|---|---|---|---|---|---|---|
|  | PIANO | ... | TRUMPET | ... | TENOR | ... | TABLATURE 6 STRINGS |
| CLASSICAL | TGrandPiano | ... | TOrcTrumpet | ... | NO SETTING | ... | NO SETTING |
| CHORUS | TGrandPiano | ... | NO SETTING | ... | TChorusTenor | ... | NO SETTING |
| POP | TPopPiano | ... | TLeadTrumpet | ... | NO SETTING | ... | TGuitarTub |
| JAZZ | TJazzPiano | ... | TJazzTrumpet | ... | NO SETTING | ... | TJazzGuitarTub |
| ... | ... | ... | ... | ... | ... | ... | ... |
| STANDARD | TGrandPiano | ... | TTrumpet | ... | NO SETTING | ... | NO SETTING |

| PART NUMBER | PART NAME | PART TEMPLATE NAME |
|---|---|---|
| 1 | Soprano | CHORUS SOPRANO A |
| 2 | Alto | CHORUS ALTO A |
| 3 | Tenor | CHORUS TENOR A |
| 4 | Bass | CHORUS BASS A |

FIG. 14

| NUMBER OF FLAT | nKeyNum | nKey | NUMBER OF SHARP | nKeyNum | nKey |
|---|---|---|---|---|---|
| 0 | 0 | 0 | 0 | 0 | 0 |
| 1 | -1 | 5 | 1 | 1 | 7 |
| 2 | -2 | 10 | 2 | 2 | 2 |
| 3 | -3 | 3 | 3 | 3 | 9 |
| 4 | -4 | 8 | 4 | 4 | 4 |
| 5 | -5 | 1 | 5 | 5 | 11 |
| 6 | -6 | 6 | 6 | 6 | 6 |
| 7 | -7 | 11 | 7 | 7 | 1 |

FIG. 15

| MUSICAL INSTRUMENT | nInstKey | BAR 1 SYMBOL | nKey | nAddKey | BAR 2 SYMBOL | nKey | nAddKey |
|---|---|---|---|---|---|---|---|
| TRUMPET | −2 | NOT EXIST | 0 | 10 | TWO SHARPS | 2 | 0 |
| TROMBONE | 0 | TWO FLATS | 10 | 10 | NOT EXIST | 0 | 0 |
| ALTO SAXOPHONE | −9 | ONE SHARP | 7 | 10 | THREE SHARPS | 9 | 0 |
| nElseNum | — | — | 2 | 0 | — | 2 | 0 |

FIG. 16

| MUSICAL INSTRUMENT | nInstKey | BAR 1 SYMBOL | nKey | nAddKey | BAR 2 SYMBOL | nKey | nAddKey |
|---|---|---|---|---|---|---|---|
| TRUMPET | −2 | NOT EXIST | 0 | 10 | TWO SHARPS | 2 | 0 |
| TROMBONE | 0 | NOT EXIST | 0 | 0 | NOT EXIST | 0 | 0 |
| ALTO SAXOPHONE | −9 | ONE SHARP | 7 | 10 | THREE SHARPS | 9 | 0 |
| nElseNum | — | — | 1 | 1 | — | 2 | 0 |

MUSICAL SCORE RECOGNITION DEVICE AND COMPUTER PROGRAM THEREOF

CROSS-REFERENCE TO RELATED APPLICATIONS

This application is based upon and claims the benefit of priority from the prior Japanese Patent Application No. 2007-266448, filed on Oct. 12, 2007, the entire contents of which are incorporated herein by reference.

BACKGROUND OF THE INVENTION

1. Field of the Invention

The present invention is related to a musical score recognition device and a computer program, and it is appropriate to use for recognition of especially a paper based musical score.

2. Description of the Related Art

It has been performed conventionally such that a paper based musical score is read out with a scanner and the like, and in a read out data, staffs, notes and various symbols are recognized to create a performance data such as an MIDI file data (see, Patent Document 1).

For example, by erasing staffs, labels on an image are separated, and then overlapped music symbols with a staff are separated, which leads to recognize the music symbols respectively. In this case, fixed type symbols, whose shape is not changed such as accidentals are recognized by matching a characteristic such as weighted direction index with music symbol data as a dictionary. Regarding music symbols of which shapes of notes change, vertical and horizontal thin lines, an ellipse composing of a note head, and thick lines composing of a beam are separated to be recognized. It is recognized based on these shapes and positional relationship thereof.

[Patent Document 1] Japanese Patent Application Laid-open No. Hei9-97058

By the way, in a musical score which affects performing with transposition musical instruments, for example, it is not notated on the musical score. In a conventional technique, about information that is not notated on a musical score, there has been a necessity to set manually by a user after the musical score recognized. Besides, a recognized musical score is a tablature, and tuning setting is required (notated). When the user wants to change tuning setting thereof, it has been required to change the tuning setting manually.

In the conventional technique, it has not been clear how musical scores are, and there is no choice but to adopt the recognition result of the musical score as it is, therefore, it has been difficult to increase the recognition rate of a musical score.

SUMMARY OF THE INVENTION

The present invention has been made considering the above-descried problems. A first object is to make the settings that the user performs after the musical score is recognized fewer than conventionally.

A second object is to increase the recognition rate of the musical score higher than conventionally.

The musical score recognition device of the present invention includes following units: a first obtaining unit obtaining an image including information of a paper based musical score by an image readable unit; a recognizing unit recognizing the musical score included in the image obtained by the first obtaining unit; a storing unit storing a part template including setting information to need to set for the musical score after the musical score is recognized; a second obtaining unit obtaining a part template corresponding to the musical score included in the image read out by the readable unit from a part template stored by the storing unit; and a setting unit setting a setting automatically for the musical score included in the image read out by the readable unit using the template obtained by the second obtaining unit.

The computer program of this present invention has following steps: a first obtaining step obtaining an image including information of a paper based musical score by an image readable unit; a recognizing step recognizing the musical score included in the image obtained by the first obtaining step; a storing step storing a part template including setting information to need to set for the music score after the musical score recognized in a storing medium; a second obtaining step obtaining the part template corresponding to the musical score included in the image read out by the readable step from the part template stored by the storing step; and a setting step setting a setting for the musical score included in the image read out by the readable step using the part template obtained by the second obtaining step.

BRIEF DESCRIPTION OF THE DRAWINGS

FIG. 6 is a view showing one example of a recognition part template application table according to the embodiment of the present invention;

FIG. 7 is a view showing one example of display contents of the result in a part template application process according to the embodiment of the present invention;

FIG. 14 is a view showing one example of a table where relations of nKey, nKeyNum, and a key signature are stored according to the embodiment of the present invention;

FIG. 15 is a view showing a first concrete example of nKey and nAddKey according to the embodiment of the present invention;

FIG. 16 is a view showing a second concrete example of nKey and nAddkey according to the embodiment of the present invention.

DETAILED DESCRIPTION OF THE PREFERRED EMBODIMENTS

Hereinafter, an embodiment of the present invention will be explained referring to drawings.

Figure 1:
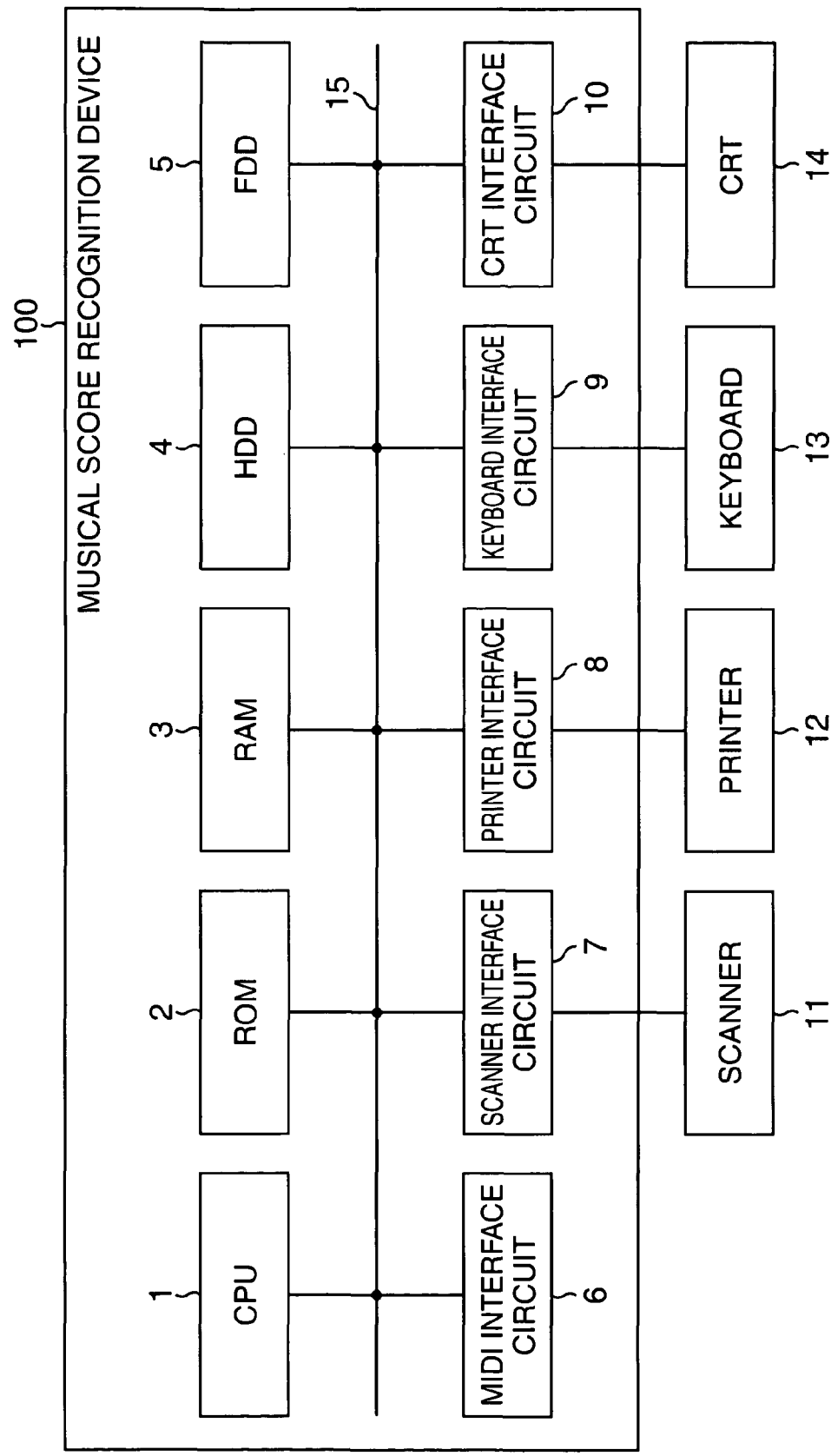
FIG. 1 is a block diagram showing one example of a configuration according to an embodiment of the present invention.

FIG. 1 is a block diagram showing one example of the configuration of the musical score recognition device.

In FIG. 1, a musical score recognition 100 has a CPU 1, an ROM 2, an RAM 3, an HDD 4, an FDD 5, an MIDI (Musical Instrument Digital Interface) interface circuit 6 a scanner interface circuit 7, a printer interface circuit 8, a keyboard interface circuit 9, a CRT interface circuit 10, and a bus 15. And a scanner 11, a printer 12, a keyboard 13, and a CRT 14 are connected to the musical score recognition device 100.

As shown in FIG. 1, the musical score recognition 100 connects the MIDI interface circuit 6 to a general computer system such as a personal computer.

The CPU 1 is a central processing unit to control the whole musical score recognition device 100 by expanding the program stored in the ROM 2 into the RAM 3 and executing thereof and the like. A timer circuit, which interrupts the CPU 1 in a predetermined cycle, is stored in the musical score recognition device 100. The RAM 3 is used as an image data buffer and a working area and the like besides a program area. A program, image data, performance data, and so on are stored in the HDD (hard disc drive) 4 and the FDD (flexible disc drive) 5.

The CRT 14 displays the video image information output from the CRT interface circuit 10 based on the control of the CPU 1. The information input from the keyboard 13 is loaded into the CPU 1 via the keyboard interface circuit 9. The printer 12 prints the printing information output from the printer interface circuit 8 based on the control of the CPU 1.

The scanner 11 scans a musical score printed on a sheet optically and converts into a binary, a gray scale, or a color image data. As the scanner 11, an arbitrary type such as a flatbed type, a hand-held type, a sheet-feed type, and so on are available. The image information read out by the scanner 11 is loaded into the RAM 3 or the HDD 4 via the scanner interface circuit 7. The MIDI interface circuit 6 is a circuit that transmits/receives MIDI data between an external MIDI apparatus such as a sound module. The bus 15 connects with the circuits stored in the musical score recognition device 100. Besides the musical score recognition device 100 may be provided with a pointing device such as a mouse and a serial interface circuit such as an RS232C and the like.

Figure 2A:
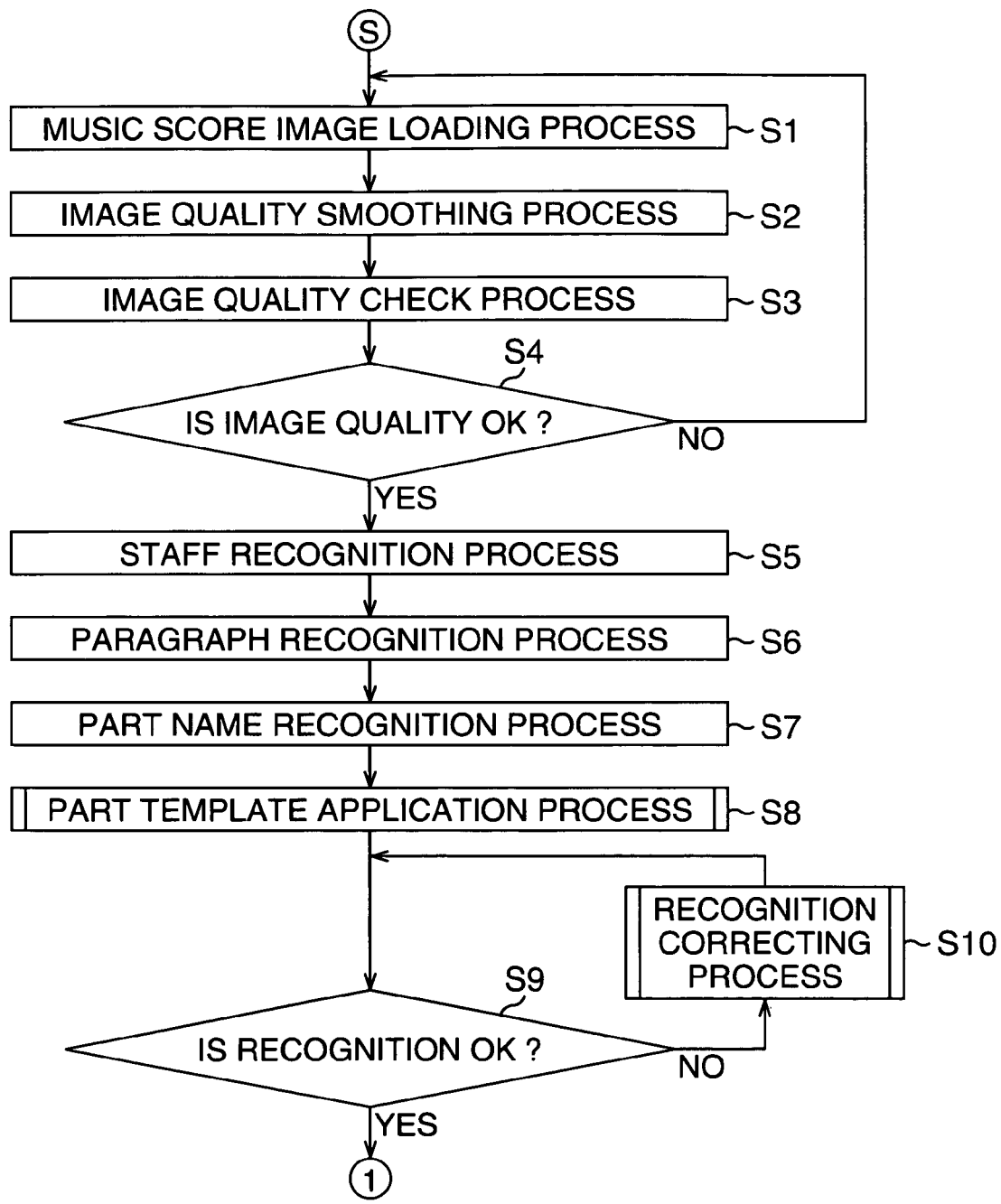
FIG. 2A is a main flowchart showing one example of CPU processes according to the embodiment of the present invention.
Figure 2B:
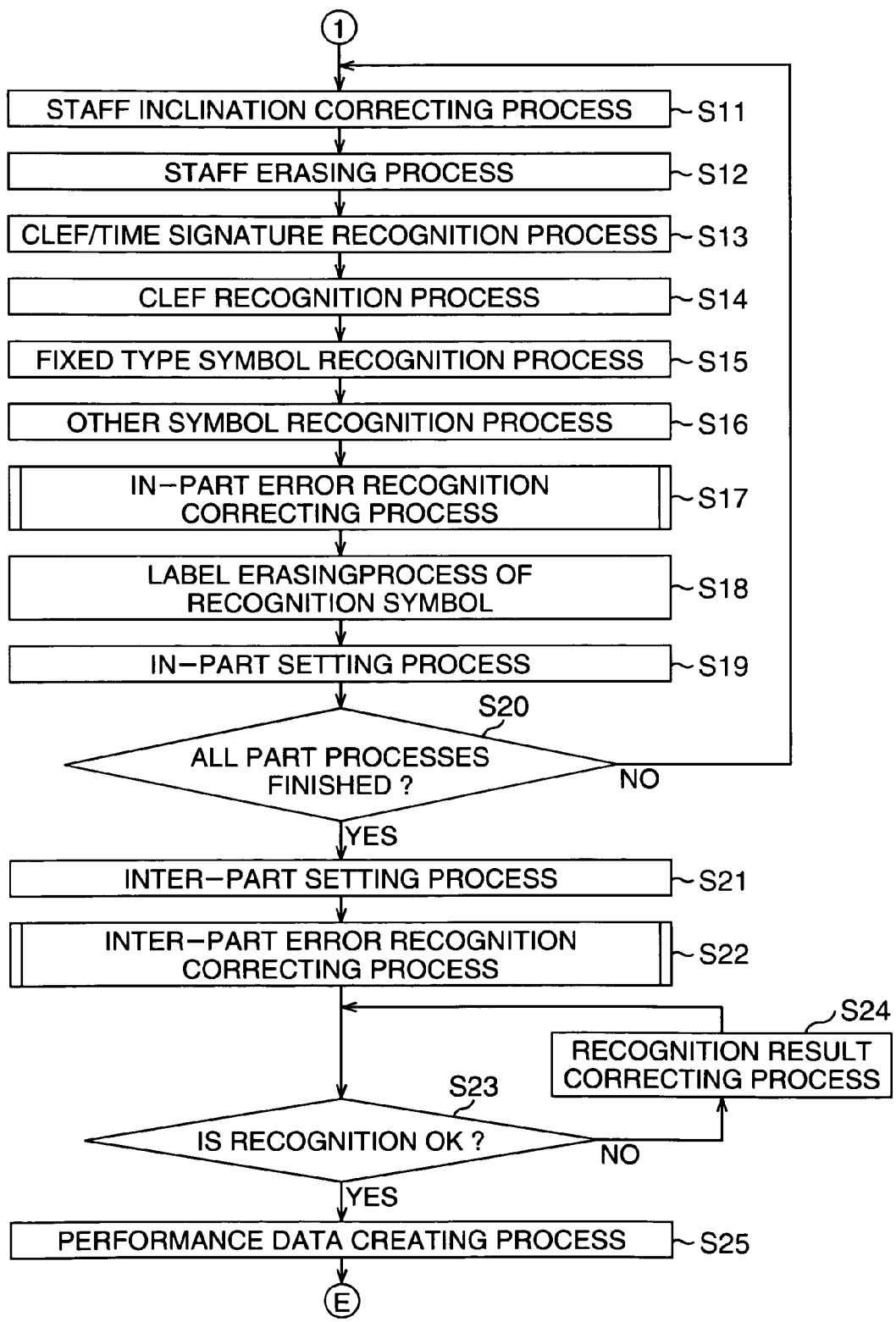
FIG. 2B is the flowchart subsequent from FIG. 2A according to the embodiment of the present invention.

FIGS. 2A and 2B are a main flowchart explaining one example of the processes of the CPU 1.

At Step S1 in FIG. 2A, the CPU 1 loads the musical score image data read out by the scanner 11 into the RAM 3. Note that it is loaded as the binary image. Accordingly, in this embodiment, a first obtaining unit is realized by executing the process of Step S1.

At Step S2, the CPU 1 executes an image quality smoothing process such as an image fusion and the like for the musical score image data in order to reduce a blur, a dot noise and so on.

At Step S3, the CPU 1 executes an image quality check process for the musical score image data. At the image quality checking process, "Magnification information and Density information" of the musical score image data is obtained and a line width of the staff and a staff interval between the lines thereof in order to obtain a standard data of a staff detection as will be described later. Herein, in order to obtain the line width and the interval, by scanning in a vertical (y) direction at a few points of a horizontal (x) direction of the two dimensional image data, all the lengths of a black run (successive black pixels) and a white run are obtained, and then a frequency distribution (histogram) data is created every obtained length. The run indicates a successive length along a direction that either the black pixel or the white pixel exists.

Since staffs exist the most on the musical score among music symbols, it is possible to estimate the line width and the interval of the staff by respectively detecting a histogram peak of the created length of the black run and a histogram peak of the length of the white run.

The magnification of the musical score image, for example, is estimated by the interval of the staff. Further, the density of the musical score image is estimated by the ratio between the line width and the interval of the staff. In a musical score recognition process, if "Magnification and Density" of the musical score image deviate from a predetermined range, the recognition rate of the musical score image is to be decreased. At Step S4, the CPU 1 judges whether or not the image quality is OK by judging whether or not these values are within the predetermined range. As a result of the judgment, in the case when "Magnification and Density" of the musical score image deviate from the predetermined range and the image quality is not OK, The CPU 1 returns to Step S1 and reads the musical score image again after changing the magnification and the density.

On the other hand, in the case when "Magnification and Density" of the musical score image data are within the predetermined range, and the image quality is OK, The CPU 1 proceeds to Step S5. After proceeding to Step S5, the CPU 1 executes a staff recognition process for the musical score image data. The staff recognition process is divided into a staff scan start position detecting process and a staff shift amount detecting process. The schema of the staff scan start position detecting process is described. The CPU 1 obtains a width of the black pixel and a width of the white pixel in order at a position in the horizontal (x) axis direction, and then, based on the obtained widths, detects positions arranged in a staff considering an error to some extent. In order to eliminate the influence from ledger lines (added horizontal lines to write notes extended from a staff), the condition that a white pixel width larger than the interval of the staff exists is added at both ends of the staff arrangement.

It is determined that a mid point of the black run in the horizontal (x) direction, of which the arrangement of black/white pixels meeting the condition exists, is the staff scan start position.

And then, the schema of the staff shift amount detecting process is described. It shifts the position to the lateral direction every one single dot from the staff scan start position (five black pixel positions). In the case when the number of the black pixels becomes a certain number (for example, three or four) or less among five positions, it shifts the five positions to the longitudinal direction, and then checks the number of the black pixels, and then shifts a y coordinate to the direction where a ratio of the back pixel increases in the vertical (y) direction. The shift amount from the staff scan start position is considered as the shift amount of the staff. The staff detection is executed by scanning in a lateral direction of the staff scan start position to the position until the number of the black pixels becomes ten.

And then, at Step S6, the CPU 1 executes a paragraph recognition process for the musical score image data. The paragraph recognition process is divided into the paragraph recognition process and a brace recognition process. In the paragraph recognition process, the CPU 1 detects the staff at the whole image, and then searches for a pair of the staff whose left ends each other are nearly at a same position, and examines whether the ends of the staff are connected with the black pixel, and recognizes a paragraph. Note that it is good to estimate existence of a paragraph such that a histogram of the black pixel in the axis x and the axis y is obtained beforehand, and based on the histogram, a blank portion is detected. When the staffs are connected with a brace each other, there is a case that notes and the like exist over the connected staffs. Consequently, it is good to execute a process for the staffs connected with a brace as one unit. Regarding the brace, it executes a recognition in a predetermined range of a left paragraph line in a similar procedure to a fixed symbol recognition process as will be described later.

At Step S7, the CPU 1 executes a part name recognition process. In the part name recognition process, a character string recognition is executed. First, the CPU 1 recognizes alphabets and other symbols, and the extracts the one of which a rectangle surrounding the symbols is arranged in a character string, and then recognizes the symbols arranged in a character string by matching it with a character string dictionary.

At Step S8, the CPU 1 executes a part template application process. In the part template application process, the CPU 1 selects a part template in which information required to set after finishing recognitions at Steps S13 to S16 is stored from plural templates stored in the HDD 4 and the like beforehand.

Figures 3, 4:
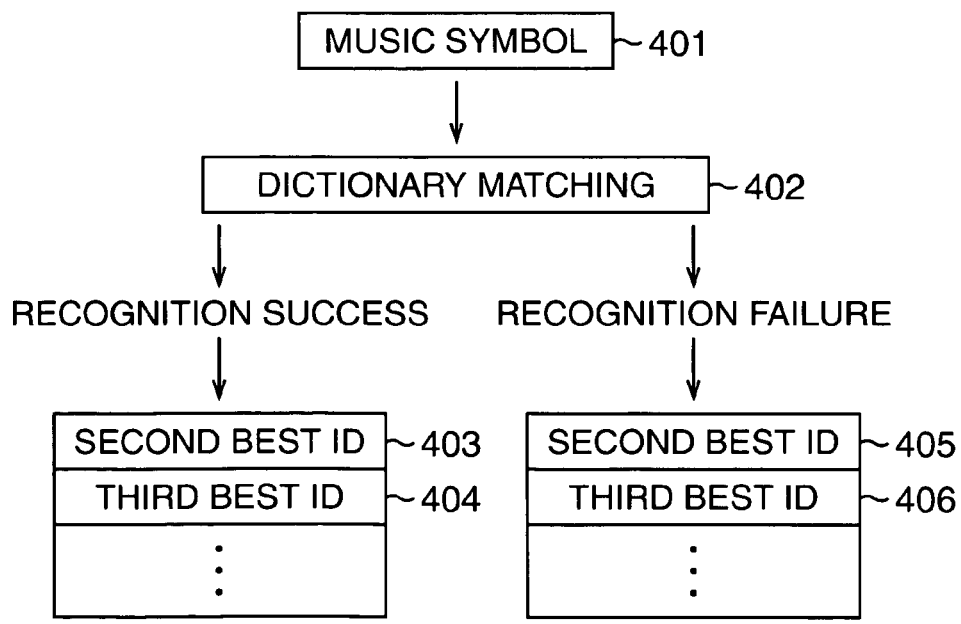
FIG. 3 is a view showing one example of a part template according to the embodiment of the present invention.
FIG. 4 is a view schematically showing one example of a method storing an ID to identify music symbols as a candidate in recognizing according to the embodiment of the present invention.

FIG. 3 is a view showing one example of the part template. In FIG. 3, a part template 301 has a template name 302, a part name 303, a part name abbreviation 304, a transposition musical instrument setting 305, a clef 306, the number of tablature staff 307, and a tablature tuning information 308.

As a character string to identify the part template 301, for example, a character string in Japanese or a character string of alphabets are stored in the template name 302.

In the part name 303, a character string to identify a part to which the part template 301 is applied is stored.

In the part name abbreviation 304, a character string to identify an abbreviated form to which the part template 301 is applied to stored.

In the transposition musical instrument 305, a numerical value is stored. It is to identify whether or not the musical instrument to which the part template 301 is applied is a transposition musical instrument, and to identify what the transposition musical instrument is in the case of the musical instrument being the transposition musical instrument. In this embodiment, in the case that the musical instrument to which the part template 301 is applied is not the transposition musical instrument, 0 is stored in the transposition musical instrument setting 305. And also, in this embodiment, when a trumpet, an acoustic bass, a piccolo, and an alto saxophone are the ones to which the part template 301 is applied, −2, −12, 12, and −9 are stored respectively in the transposition musical instrument setting 305.

In the clef 306, a numerical value corresponding to kinds of the clef to which the part template 301 is applied. In this embodiment, when the clef to which the part template 301 is applied is a G-clef, 0 is stored in the clef 306. And also, in this embodiment, when the clef to which the part template 301 is applied is an F-clef, 1 is stored in the clef 306.

In the number of tablature staffs 307, a numerical value indicating "The number of the staff lines of the musical score" to which the part template 301 is applied.

In the tablature tuning information 308, a numerical value indicating tuning to the staff line of the musical score is stored. In the tablature tuning information 308, information for "The number of the staff lines of the musical score" to which the part template 301 is applied is stored.

Note that at least the transposition musical instrument setting 305, the clef 306, the number of tablature staff 307 and the tablature tuning information 308 are included in the part template 301. However, it is favorable that the template name 302 and the part name 303 are included. Information stored in the template name 302, the part name 303, the part name abbreviation 304, the transposition musical instrument setting 305, the clef 306, the number of tablature staff 307, and the tablature tuning information 308 is not limited to what has been described above.

Detail of the part template application process at Step S8 will be described later.

And at Step S9, the CPU 1 displays the result of the part template application process at Step S7 together with the result of the paragraph recognition process at Step S6 on the CRT 14, and then lets a user check whether or not the recognition result of the paragraph and the application result of the part template 301 are correct, after that, judges whether or not the recognition is correct. As a result of the judgement, when the recognition is not OK, the CPU 1 proceeds to Step S10 to execute a recognition correcting process correcting the recognition result of the paragraph and the application result of the part template 301, after that, it returns to Step S9. Regarding to a score, besides the one that the part structure of the paragraph is same, there are cases such that a part is omitted or added therein, and a solo score and a large staff change every paragraph at a same part. A response to such a part is conducted by contrast with a brace and the like, however there is a case that a response to the part is not determined uniquely, which allows the recognition result of the paragraph to be corrected beforehand. And further, there is a case such that the user wants to change the part template 301 to the user's favorite one. Consequently, the part template 301 selected automatically at Step S7 is to be changed. The recognition correcting process (correction of the application result of the part template 301) will be explained in detail later.

Hereinbefore, in this embodiment, after executing the process at Step S9, a portion of a displaying unit is realized.

When the staff recognition fails, the CPU 1 can not execute processes thereafter, it is necessary to load into the image again after changing the magnification and the density. Accordingly, at Step S9, it can display the recognition result of the staff on the CRT 14, and then judge whether or not the recognition result is correct based on a result of the user's operation for "Recognition result of the staff" displayed. In the procedure, after the recognition result of the staff is judges to be incorrect, the CUP 1 returns to Step S1, and then loads into the musical score image data again. On the other hand, when the recognition result of the staff is judged to be correct, the recognition result of the paragraph is displayed, and it is favorable to let the user check the recognition result of the paragraph.

On the other hand, at Step S9, when the recognition is judged to be OK, the CPU 1 selects one part included in the obtained musical score at Step S1, and proceeds to Step S11 shown in FIG. 2B. After proceeding to Step S11, the CPU 1 executes a staff inclination correcting process. The schema of the staff inclination correcting process is described. It shifts a pixel string longitudinally every rectangle row to be recognition processed based on the shift amount of the staff obtained previously. Note that it is more accurate to calculate the shift amount every staff, and then correct the shift in the image of the rectangle to be recognition processed. However, it can be good that one shift amount is calculated in the whole image of the musical score read out at Step S1, and the CPU 1 shifts the whole image of the musical score.

After that the CPU 1 erases the labels connected to the upper and the lower ends of the rectangle to be recognition processed as a composition element of the upper and the lower parts. Finally, the CPU 1 detects blank portions at the upper and the lower ends and reduces the rectangle to be recognition processed. Note that the label indicates a pixel area independent from other pixel areas. For example, a black pixel label in a binary image composed of the white pixel and the black pixel is explained. A connection state of the pixel in the upward/downward, rightward/leftward, and diagonal directions is detected, and a group of the black pixels to be judged as one block based on the detected result is called a label. Note that the case of judging a connection of the black pixels in the diagonal direction in addition to the upward/downward and rightward/leftward is called an eight-connection label, and the case of judging a connection of the black pixels only in the upward/downward and rightward/leftward is called a four-connection label. In this embodiment, for example, not only the area where the black pixels are connected, but also an area of a polygon (a rectangle and the like) surrounding the area where the black pixels are connected is considered as a label.

At Step S12, the CPU 1 executes a staff erasing process. In the staff erasing process, it erases the staff, which is recognized at Step S5 and the inclination thereof is corrected at Step S11.

At Steps S13 to S16, recognition processes of various music symbols are executed. There are roughly three kinds categorized by shapes and positions in the music symbols of the musical score.

(1) The ones in a fixed type and the upper and the lower positions thereof are almost fixed (clefs, time signatures, and so on)

(2) The ones in a fixed type and the upper and the lower positions thereof are flexible (accidentals, rests and so on)

(3) The ones in an unfixed type and the positions thereof are not fixed, as well (notes, slurs, ties, and so on)

In this embodiment, these are recognized in appropriate methods respectively in the order of a clef/time signature recognition, a note recognition, a fixed type symbol recognition, the character string recognition, and a slur/tie recognition. Note that music symbols are not limited to these and any music symbols written on musical scores are applied.

The reasons why the clef/time signature recognition is executed first are as follows. Executing the recognition first whose process cost is low, and then easing the symbols lead to reduce the process cost of the following recognitions. Further, recognizing more secure ones first also leads to reduce error recognitions in the following recognitions. The reason why the fixed type symbol recognition is executed after the note recognition is as follows. Executing the note recognition, being the recognition method that is not likely to be influenced by the label contact, and then erasing the symbols are to make the recognition of the symbols such as accidentals that contact the note, possible. And the reason why the slur/tie recognition comes last is to decrease the labels as many as possible, which are to be the subject of the slur recognition, whose process cost is high. And also, only the labels around the notes detected previously being the subject of the slur/tie recognition leads to further reduce the process cost of the slur/tie recognition and reduce the error recognitions of the slur and the tie.

At Step S13, the CPU 1 executes the clef/time signature recognition process to recognize the clefs and the time signatures as the music symbols placed at the fixed positions on the staff. At first, in the rectangle area where the obtained staff is included, it obtains the black pixel histogram in the longitudinal direction, and sets the band where the amount of the black pixel is a threshold value or more for the subject of matching as the place where the clefs and the time signatures possibly exist. Matching, for example, is performed based on "Peripheral characteristic in the lateral direction" obtained at a few points between the staff lines. The peripheral characteristic is obtained such that it scans inward from the right/left ends of the rectangle area where only the symbols, which are the subject of matching are included toward the white pixel areas at a few points between the staff lines, and obtains the distance toward the black pixel area primarily (first time) or several times (twice or more). When matching fails, it combines with the adjacent band and executes the recognition again. And then it erases the recognized music symbols from the image data.

At Step S14, the CPU 1 executes the note recognition process. In the note recognition process, it divides the image data into the longitudinal thin line, the lateral thin line and the thick line images. And then, it detects the symbols and the portions of the symbols from the image, and then recognizes the symbols such as the notes all together.

At Step S15, the CPU 1 executes the fixed type symbol recognition process. In the fixed type symbol recognition process, it obtains a well-known contour line weighted direction index, and calculates a degree of matching of the label size and the contour line weighted direction index in the symbol data of the dictionary, and then normalizes the degree of matching. After that, it outputs the symbol whose matched result is the highest. Besides the size and the weighted direction index, other characteristics such as the peripheral characteristic can be used. As measures for the one that the label is cut after staff erasing, it registers the label that is cut after staff erasing in the dictionary. In the case when the label is recognized as a music symbol, it recognizes the label connecting with the peripheral label again.

At Step S16, the CPU 1 executes other symbol recognition processes. In this embodiment, regarding other symbol recognition processes, the symbol recognition process including the character string recognition process and the slur/tie recognition process are executed.

In the character string recognition, in order to recognize a character string of tempo and the like, using the alphabets and other symbols after being recognized in the fixed type symbol recognition process, it extracts the one that the rectangle surrounding these symbols are arranged in a character string. After matching this to the character string dictionary, it recognizes symbols in a character string.

The CPU 1 executes the slur/tie recognition process. In the slut/tie recognition process, the peripheral labels of the detected notes out of the remaining labels after these processes are thinned down to approximate a multiple arc. Since there is a case that the line is cut off due to the symbols that have been erased before, it makes the obtained multiple arcs connect each other. Finally, it recognizes the slur and the tie from such as the relation among obtained arc shape, the thickness of the original image, and the notes.

In this embodiment, regarding the processes from Steps S13 to S16 as above, when the music symbol recognitions fail, the CPU 1 is to store the predetermined number of ID's, which are for identifying the music symbols which have been candidates in the music symbol recognition, in the RAM 3 in descending order of the degree of matching.

FIG. 4 is a view conceptually showing one example how to store the IDs to identify the music symbols which have been candidates in recognitions.

As shown in FIG. 4, a dictionary matching 402 is performed to a music symbol 401 extracted from the musical score image obtained at Step S1. In the dictionary matching 402, when the CPU 1 can obtain a music symbol, of which degree of matching (point) to the music symbol 401 is a threshold value or more, from the dictionary, it judges to succeed in recognition of the music symbol 401. Further, the CPU 1 stores IDs 403, 404 in a predetermined area, for example, of the RAM 3. These IDs are for identifying the music symbols in descending order of the degree of matching (point) among the music symbols of which degree of matching (point) to the music symbol 401 is not the threshold value or more.

On the other hand, when the CPU 1 can not obtain the music symbol, whose degree of matching (point) to the music symbol 401 is the threshold value or more, from the dictionary, it stores IDs 405, 406 to identify the music symbols in descending order of degree of matching (point) of the music symbol, in a predetermined area, for example, of the RAM 3. In this embodiment, among the music symbols whose degree of matching (point) is not the threshold value or more, the IDs 403, 405, which are to identify the music symbol whose degree of matching (point) is the highest, are considered to be second best IDs, and the IDs 404, 406, which are to identify the music symbols whose degree of matching (point) is the second highest after the IDs 403, 405, are considered to be third best IDs.

Hereinbefore, in this embodiment, a recognizing unit is realized after executing the processes of Steps S13 to S16.

At Step S17, the CPU 1 executes an in-part error recognition correcting process. In the in-part error recognition correcting process, among the parts included in the obtained musical score at Step S1, a portion, which can be judged as an error recognition in only one part, is corrected using the part template 301 selected at Step S8. The in-part error recognition correcting process will be described in detail later.

At Step S18, the CPU 1 executes a label erasing process of recognition symbols. In the label erasing process of recognition symbols, the CPU 1 erases the music symbols recognized at Steps S1 to S16 and the slurs and the ties and the like recognized at Step S17 from the image.

At Step S19, the CPU 1 executes an in-part setting process. In the in-part setting process, based on the music symbols recognized at Steps S13 to S17, setting of the music symbols included in a bar (a bar attribute setting) and setting of a parent-child relationship between the music symbols are performed. For example, setting of the parent-child relationship between the music symbols is performed such that an accidental whose positional relationship between a note is appropriate is set for the accidental to the note. Note that an accidental, whose positional relationship between a note is not appropriate, is erased from a recognition result or considered as a key signature depending on a positional relationship between a staff and a bar as an error recognition. At Step S19, the process is executed only for the one that can be set with information of one part among the parts included in the musical score obtained at Step S1.

At Step S20, the CPU 1 judges whether or not the processes of Steps S11 to S20 are executed for all the parts included in the musical score obtained at Step S1. As a result of the judgement, when the processes are not executed for all the parts included in the musical score obtained at Step S1, it returns to Step S1, and then repeats Steps S1 to S20 until the processes are executed for all the parts included in the musical score obtained at Step S1.

At Step S21, the CPU 1 executes an inter-part setting process. In the in-part setting process executed at Step S19, the process is executed only for the one that can be set with information of one part among the parts included in the musical score obtained at Step S1. However, in the inter-part setting process, regarding setting, the process is executed only for the one that needs information of plural parts included in the musical score obtained at Step S1. Concretely, setting of the bar attribute and the setting of the parent-child relationship between music symbols and the like are executed.

At Step S22, the CPU 1 executes an inter-part error recognition correcting process. In the in-part error recognition correcting process executed at Step S17, a portion, which can be judged as an error recognition in only one part among the parts included in the musical score obtained at Step S1, is corrected, however, in the inter-part error recognition correcting process, a portion, which can not be judged as an error recognition unless plural parts included in the musical score obtained at Step S1 are considered, is corrected using the part template 301 selected at Step S8. The inter-part error recognition correcting process will be described in detail later.

In this embodiment as above, the in-part error recognition correcting process (Step S17) and the inter-part error recognition correcting process (Step S22) are executed separately, which leads the processes to be executed efficiently.

At Step S23, based on the process results of Steps S1 to S22, for example, the CPU 1 creates the image data of the musical score read out at Step S1 to display on the CRT 14 (hereinafter, it is called the musical score image data depending on necessity). And then, it judges whether or not the musical score image data is OK after the user checks whether or not the musical score image data is correct. As a result of the judgement, when the musical score image data is not OK, it proceed to Step S24. And then, the CPU 1 corrects the recognition result of the music symbols based on the operation of the mouse, the keyboard 13, and so on by the user. After that it returns to Step S23.

On the other hand, when the musical score image data is judged to be OK at Step S23, it abbreviates Step S24 and then, proceeds to Step S25.

After proceeding to Step S25, the CPU 1 executes a performance data creating process. In the performance data creating process, based on the recognized and corrected various music symbols (note information, clef information, time signature information fixed type symbol information character string information, and slur/tie information), for example, an MIDI file data being a well-known performance data format, is created as a performance data. And then, the processes from the flowchart in FIG. 2A, and FIG. 2B are finished.

Figure 5:
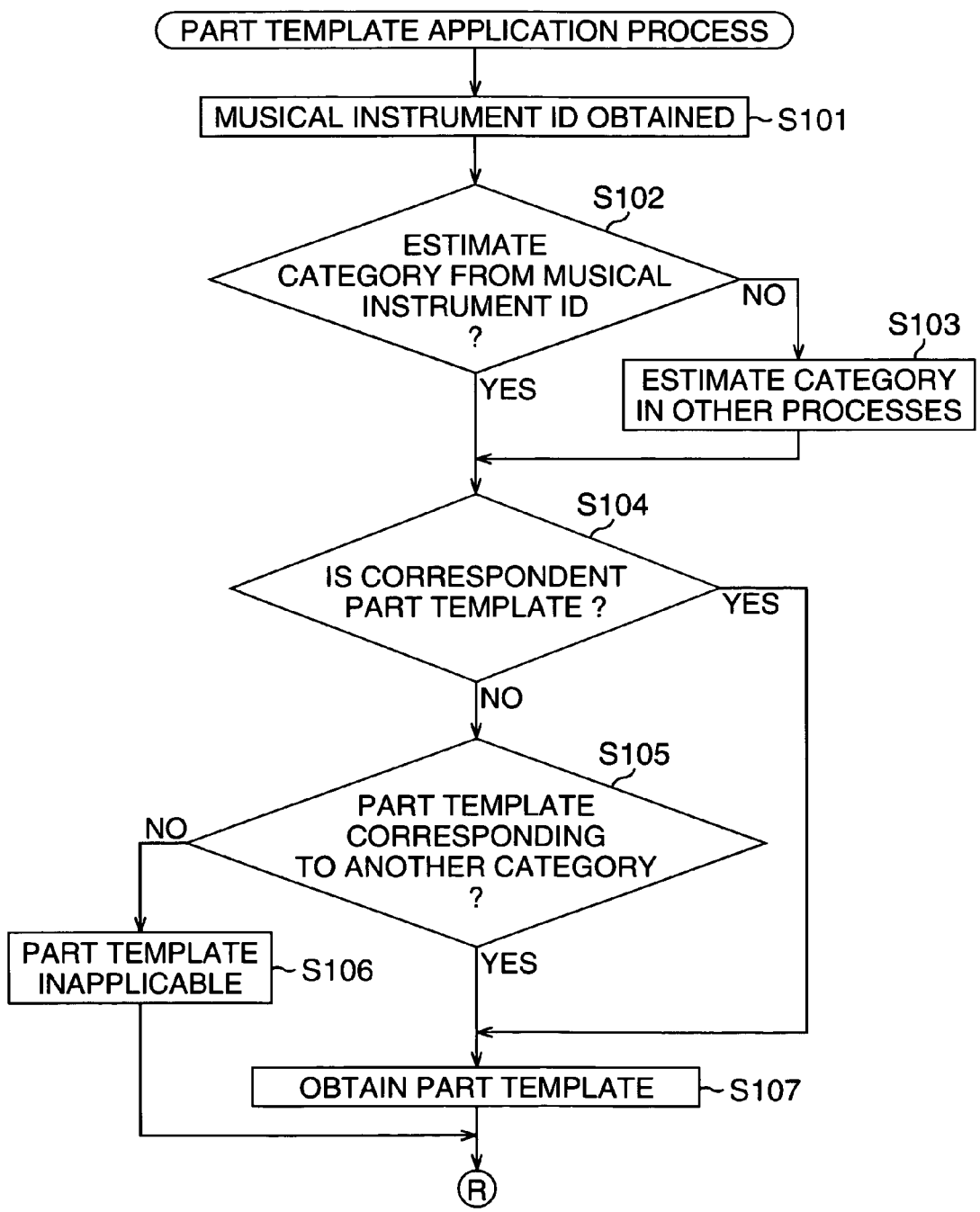
FIG. 5 is a flowchart explaining one example of a part template application process at Step S8 in FIG. 2A according to the embodiment of the present invention.

One example of the part template application process at Step S8 in FIG. 2A is explained referring to a flowchart in FIG. 5.

At Step S101, the CPU 1 obtains a musical instrument ID corresponding to the part name recognized at Step S7 in FIG. 2A from a database registered in the HDD 4 and the like beforehand. The musical instrument ID is an ID to identify a means for performance, and besides the ID to identify musical instruments, an ID to identify a chorus (one part thereof), for example, and the like are included in the musical instrument ID. At Step S101, the musical instrument ID corresponding to an MIDI program number can be obtained. And also, when it is found that the musical score obtained at Step S1 is a tablature after the staff recognition process at Step S5, the musical instrument ID corresponding to the tablature can be obtained.

At Step S102, the CPU 1 judges whether or not it can estimate a category of the musical score obtained at Step S1 based on the musical instrument ID obtained at Step S101. For example, when the musical instrument ID corresponding to "Conttalto" is obtained, the CPU 1 can estimate that the category of the musical score obtained at Step S1 is a chorus, only after referring to the musical instrument ID. As a result of the judgement, when the CPU 1 can not estimate the category of the musical score obtained at Step S1, it proceeds to Step S103. After proceeding Step S103, the CPU 1 estimates the category of the musical score obtained at Step S1 based on the process results of Steps S5 to S7. And then, it proceeds to Step S104.

On the other hand, when the CPU 1 can estimate the category of the musical score obtained at Step S1, it abbreviates Step S103, and then proceeds to Step S104.

After proceeding to Step S104 as above, the CPU 1 judges whether or not the part template 301, which corresponds to the musical instrument ID obtained at Step S101 and the category estimated as described before, exists in a recognition part template application table.

FIG. 6 is a view showing one example of the recognition part template application table. A recognition part template application table 601 shown in FIG. 6 is stored, for example, in the HDD 4 beforehand.

In FIG. 6, the musical instrument ID and the category are corresponded to each other, and information to identify the part template 301 (information stored in the template name 302) is stored in the recognition part template application table 601. Note that in FIG. 6, "no setting" indicates that there is not the part template 301 corresponding thereto. When the user edits the recognition part template application table 601 liberally, it is favorable to store information that the user can recognize easily as information to identify the part template 301. From this procedure, the user can search the part template 301 from the recognition part template application table 601 easily.

As a result of the judgement at Step S104, when there is the corresponding part template 301 in the recognition part template application table 601, the CPU 1 proceeds to Step S107 as will be described later. On the other hand, when there is not the corresponding part template 301 in the recognition part template application table 601, the CPU 1 proceeds to Step S105.

After proceeding to Step S105, the CPU 1 judges whether or not there is the part template 301, which corresponds to the musical instrument ID obtained at Step S101 and the category different from the category estimated as described before, in the recognition part template application table 601. As a result of the judgement, when there is the corresponding part template 301 in the recognition part template application table 601, it proceeds to Step S107 as will be described later.

On the other hand, when there is not the part template 301 in the recognition part template application table 601, the part template 301 corresponding to the musical instrument ID obtained at Step S101 is not registered in the recognition part template application table 601 (all the columns corresponding to the musical instrument ID obtained at Step S101 are shown as "no setting"), the CPU 1 proceeds to Step S106. And then, at Step S106, the CPU 1 displays that the part template is inapplicable on the CRT 14. And next, it proceeds to Step S9 in FIG. 2A. In the case of proceeding to Step S9 herewith, the result of the part template application process at Step S7 is not to be displayed.

On the other hand, when there is the part template 301 in the recognition part template application table 601, the CPU 1 proceeds to Step S107. After proceeding to Step S107, the CPU 1 obtains the corresponding part template 301 (information thereof). And then, it proceeds to Step S9 in FIG. 2A. When it proceeds to Step S9 in this manner, the result of the part template application process at Step S7, together with the result of the paragraph recognition process at Step S6, is to be displayed.

FIG. 7 is a view showing one example of display contents of the result in the part template application process. As shown in FIG. 7, in this embodiment, a table 701, in which a part number, (part No.), a part name, and a part template name are related one another, is displayed together with the result of the paragraph recognition process as the result of the part template application process. In this embodiment, the content of the part template name at the table 701 is changeable based on the user's operation.

Hereinbefore, in this embodiment, executing the processes of Steps S101 to S105, and Step S107 leads a second obtaining unit to be realized.

At Step S105, when a plurality of the musical instrument IDs obtained at Step S101 and a plurality of the part templates 301 corresponding to a category different from the estimated category are present in the recognition part template application table 601, the CPU 1 can obtain the part template 301 corresponding to the closest category to the estimated category, for example, by selecting other categories in order of priority, and then searching the part template 301 within the category.

Figure 8:
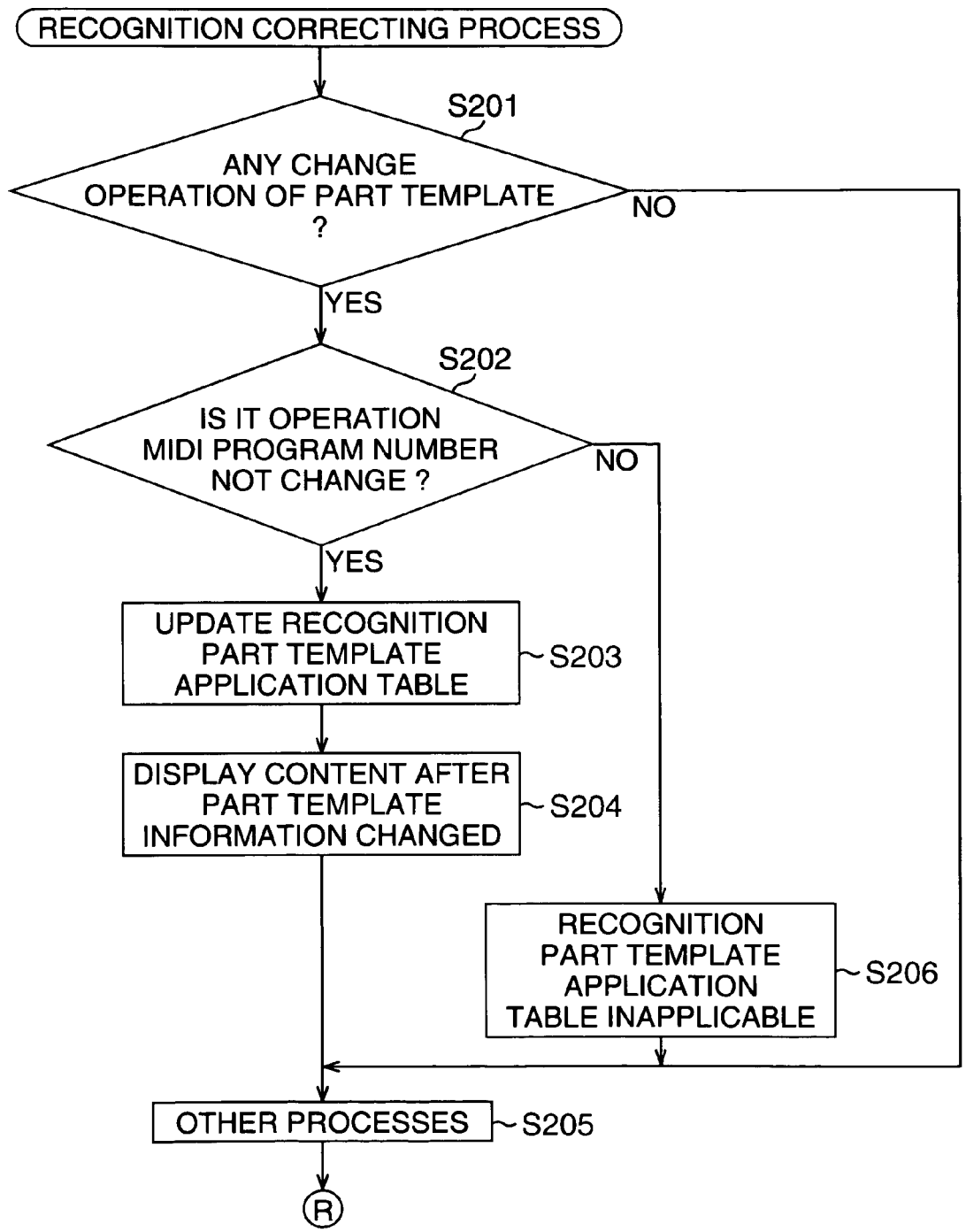
FIG. 8 is a flowchart explaining one example of a recognition correcting process at Step S10 in FIG. 2A according to the embodiment of the present invention.

One example of the recognition correcting process at Step S10 in FIG. 2A is explained referring to a flowchart in FIG. 8.

At step S201, the CPU 1 judges whether or not the operation, which is to change the part template 301 obtained in the part template application process at Step S8 in FIG. 2A based on the user's operation, is performed by the user. As a result of the judgement, when the operation to change the part template 301 is not performed by the user, the CPU 1 proceed to Step S205 and executes other processes. As other processes, for example, the process, of which correction of the recognition result of the paragraph and the like is performed based on the user's operation, is exemplified.

On the other hand, when the operation to change the part template 301 is performed by the user, the CPU 1 proceeds to Step S202.

In this embodiment as above, executing the process of Step S201 realizes an accepting unit.

After proceeding to Step S202, the CPU 1 judges whether or not the MIDI program number, to which the part template 301 is applied, does not change even after changing the part template 301 following the operation. As a result of the judgement, in the MIDI program number changing, the CPU 1 proceeds to Step S206 as will be described later. On the other hand, in the MIDI program number not changing, the CPU 1 proceeds to Step S203.

After proceeding to Step S203, the CPU 1 changes (updates) the content of the recognition part template application table 601 (information to identify the part template 301) following the operation content judged at Step S201. Next time or later, the part template 301 is to be obtained following the content changed herein (see, Step S107 in FIG. 5). In this embodiment as above, by executing the process of Step S203, a part of a storing unit is realized.

At Step S204, the CPU 1 changes the display content of the result in the part template application process (the content of the part template name at the table 701 shown in FIG. 7) based on the change result of the recognition part template application table 601. In this embodiment, executing the process of Step S204 realizes a part of a display unit.

After proceeding to Step S205, the CPU 1 executes other processes, and then returns to Step S9.

When it is judged that the MIDI program number changes at Step S202, after proceeding to Step S206, the CPU 1 displays that the recognition part template application table 601 is not updatable on the CRT 14. After proceeding to Step S205, the CPU 1 executes other processes, and then returns to Step S9.

In this embodiment as above, the change of the recognition part template application table 601, as if the MIDI program number changes, is not accepted. That is, when just changing the kind of the part template 301 according to the user's preference, the recognition part template application table 601 can be changed. When there is a possibility of an error recognition in the part name recognition, the change of the recognition part template application table 601 is limited (incapable).

For example, in the recognition part template application table 601, the part template 301 applied to "a trumpet" can be changed to the part template 301 applied to "a solo trumpet". By contrast, the part template 301 applied to "a trombone" can not be changed to the part template 301 applied to "a tuba". Thus there is a possibility that "Tub" is recognized as "Tb" in error.

If it is verified that the part template 301 applied to "the trombone" changes to the part template 301 applied to "the tuba", there is a problem as below. Namely, in a recognition of a musical score next time or later, there occurs a possibility that in the case when it is recognized as "the trombone", the part template 301 applied to "the tuba" is obtained from the recognition part template application table 601.

As described above, in this embodiment, executing the processes of Steps S202 and S206 realizes a restricting unit.

In this embodiment, it is to solve the above-described problem so as not to accept a change of the recognition part template application table 601 so that the MIDI program number changes, however, it is not always necessary to do in this manner. For example, it can accept a change of the recognition part template application table 601 so that the MIDI program number changes. Or with a procedure different from the above-described one, it can not accept a change of the recognition part template application table 601 so that the MIDI program number changes depending on the circumstances. Further, it can return the content of the recognition part template application table 601 to the initial state based on the user's operation.

Figure 9:
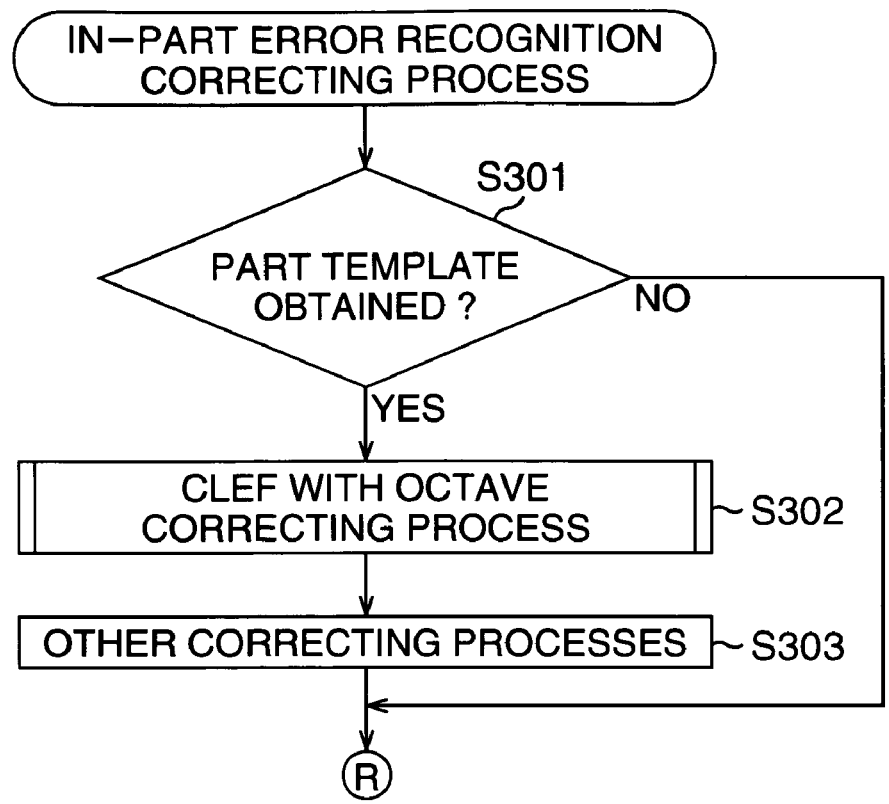
FIG. 9 is a flowchart explaining one example of an in-part error recognition process at Step S17 in FIG. 2B according to the embodiment of the present invention.

One example of the in-part error recognition correcting process at Step S17 in FIG. 2B is explained referring to a flowchart in FIG. 9.

At Step S301, the CPU 1 judges whether or not the part template 301 (information thereof) is obtained at the flowchart in FIG. 5. As a result of the judgement, when it can not obtain the part template 301, it returns to Step S19 in FIG. 2B.

Figure 10:
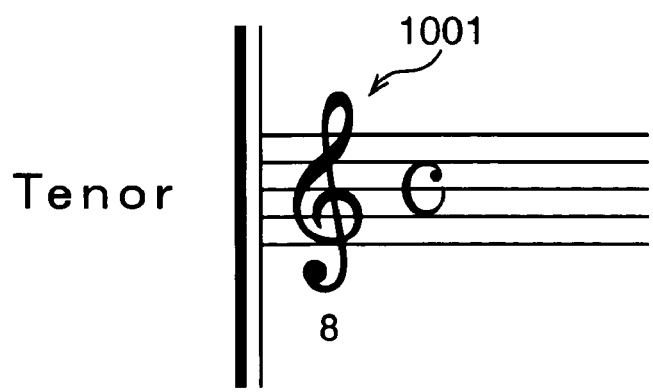
FIG. 10 is a view showing one example of a clef with an octave according to the embodiment of the present invention.

On the other hand, when the CPU 1 obtains the part template 301, it proceeds to Step S302, after that, it executes a clef with an octave correcting process using the obtained part template 301 (information thereof). One example of a clef with an octave 1001 is shown in FIG. 10. In the clef with an octave correcting process, with the part template 301 (information thereof), the CPU 1 corrects the clef recognized at Step S13 in FIG. 2B. The clef with an octave correcting process will be described in detail later.

At Step S303, the CPU 1 executes the in-part error recognition correcting process except the clef with an octave correcting process. As described before, the in-part error recognition correcting process is a process that corrects the portion, where can be judged as an error recognition only in one part, with the part template 301. And then, it returns to Step S18 in FIG. 2A.

In this embodiment as described above, performing the flowchart in FIG. 9 realizes a part of a setting unit.

Figure 11:
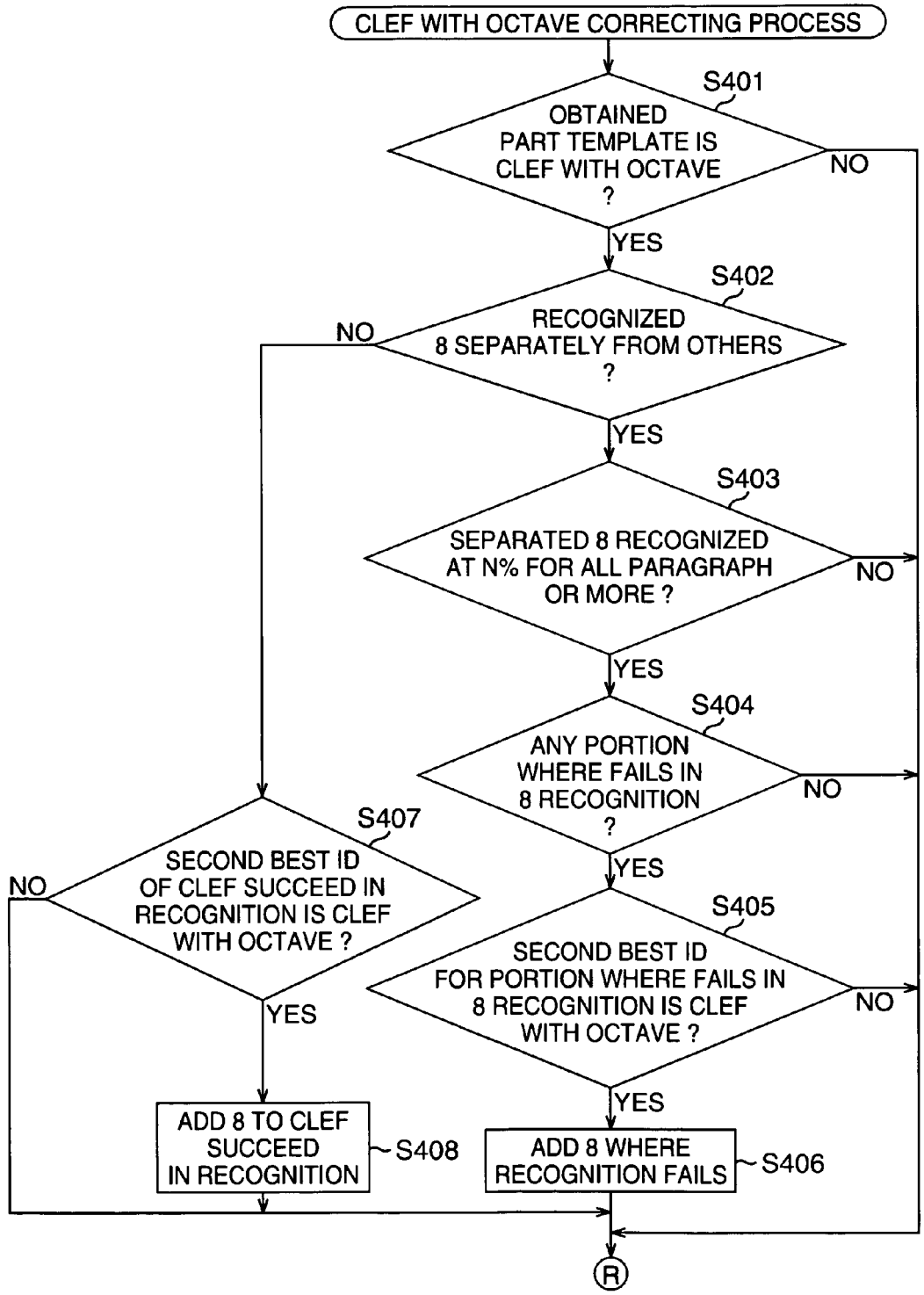
FIG. 11 is a flowchart explaining one example of a clef with an octave correcting process at Step S302 in FIG. 9 according to the embodiment of the present invention.

One example of the clef with an octave correcting process at Step S302 in FIG. 9 is explained referring to a flowchart in FIG. 11.

At Step S401, the CPU 1 judges whether or not a numerical value corresponding to the clef with an octave is stored in the clef 306 of the part template 301 obtained at Step S107 in FIG. 5. As a result of the judgement, when the numerical value corresponding to the clef with an octave is not stored in the clef 306 of the part template 301 obtained at Step S107 in FIG. 5, it returns to Step S303 in FIG. 9. In this embodiment as above, when the numerical value corresponding to the clef with an octave is not stored in the clef 306 of the part template 301, it return to the flowchart in FIG. 3, which leads to speed up the clef with an octave correcting process.

On the other hand, when the numerical value corresponding to the clef with an octave is stored in the clef 306 of the part template 301 obtained at Step S107, the CPU 1 proceeds to Step S402.

After proceeding to Step S402, as a result of the clef recognition at Step S13, the CPU 1 judges whether or not a portion where [8] separated from other clefs is recognized exists. As a result of the judgement, when [8] separated from other clefs is not recognized, the CPU 1 proceeds to Step S407.

On the other hand, when a portion where [8] separated from other clefs is recognized exists, the CPU 1 proceeds to Step S403. After proceeding to Step S403, the CPU 1 judges whether or not [8] separated from other clefs is recognized at N [%] (N is a positive value) out of all the paragraphs of the musical score obtained at Step S1 or more. As a result of the judgement, when [8] separated from other clefs is not recognized at N [%] out of all the paragraphs of the musical score obtained at Step S1 or more, the CPU 1 returns to Step S303.

On the other hand, when [8] separated from other clefs is recognized at N [%] out of all the paragraphs of the musical score obtained at Step S1 or more, the CPU 1 proceeds to Step S404. After proceeding to Step S404, the CPU 1 judges whether or not a portion that fails in a recognition of [8] exists based on the result of the clef recognition at Step S13 in FIG. 2B. As a result of the judgement, when a portion that fails in a recognition of [8] does not exist, the CPU 1 returns to Step S303 in Fig.

On the other hand, when a portion that fails in a recognition of [8] exists, the CPU 1 proceeds to Step S405. After proceeding to Step S405, the CPU 1 judges whether or not the second best ID 405 of the portion that fails in a recognition of [8] is an ID to identify the clef with an octave. As a result of the judgement, when the second best ID 405 of the portion that fails in a recognition of [8] is not the ID to identify the clef with an octave, the CPU 1 returns to Step S303.

On the other hand, when the second best ID 405 of the portion that fails in a recognition of [8] is the ID to identify the clef with an octave, the CPU 1 proceeds to Step S406. After proceeding to Step S406, the CPU 1 adds [8] to the portion that fails in a recognition of [8], and then changes the clef without an octave to the clef with an octave. And then it returns to Step S303 in FIG. 9.

At Step S402, when it is judged that [8] separated from other clefs is not recognized, it is judged to succeed in a recognition of the clef as the one with an octave. And then the CPU 1 proceeds to Step S407. After proceeding to Step S407, the CPU 1 judges whether or not the second best ID 403 of the clef that succeeds in a recognition is the ID to identify the clef with an octave. AS a result of the judgement, when the second best ID 403 of the clef that succeeds in a recognition is not the ID to identify the clef with an octave, the CPU 1 returns to Step S303.

On the other hand, when the second best ID 403 of the clef that succeeds in a recognition is the ID to identify the clef with an octave, the CPU 1 proceeds to Step S408. After proceeding to Step S408, the CPU 1 adds [8] to the clef that succeeds in a recognition, and then changes to the clef without an octave to the clef with an octave. And then the CPU 1 returns to Step S303. In this case, at Step S13 in FIG. 2B, it is succeeded in a recognition as a clef without an octave, however based on the clef 306 of the part template 301 obtained at Step S107 in FIG. 5, it is found that the clef is actually the clef with an octave.

At Step S405 in FIG. 11, when it is judged that the second best ID 405 of the portion that fails in a recognition of [8] is not the ID to identify the clef with an octave, the process in FIG. 11 is terminated. However it is not necessary to perform in this manner. For example, when it is judged that the second best ID 405 of the portion that fails in a recognition of [8] is not an ID to identify the clef with an octave, it is judged whether or not a third best ID 406 of the portion that fails in a recognition of [8] is the ID to identify the clef with an octave. As a result of the judgement, when the third best ID 406 is the ID to identify the clef with an octave, it proceeds to Step S406, otherwise, the process in FIG. 11 is to be terminated.

Figure 12:
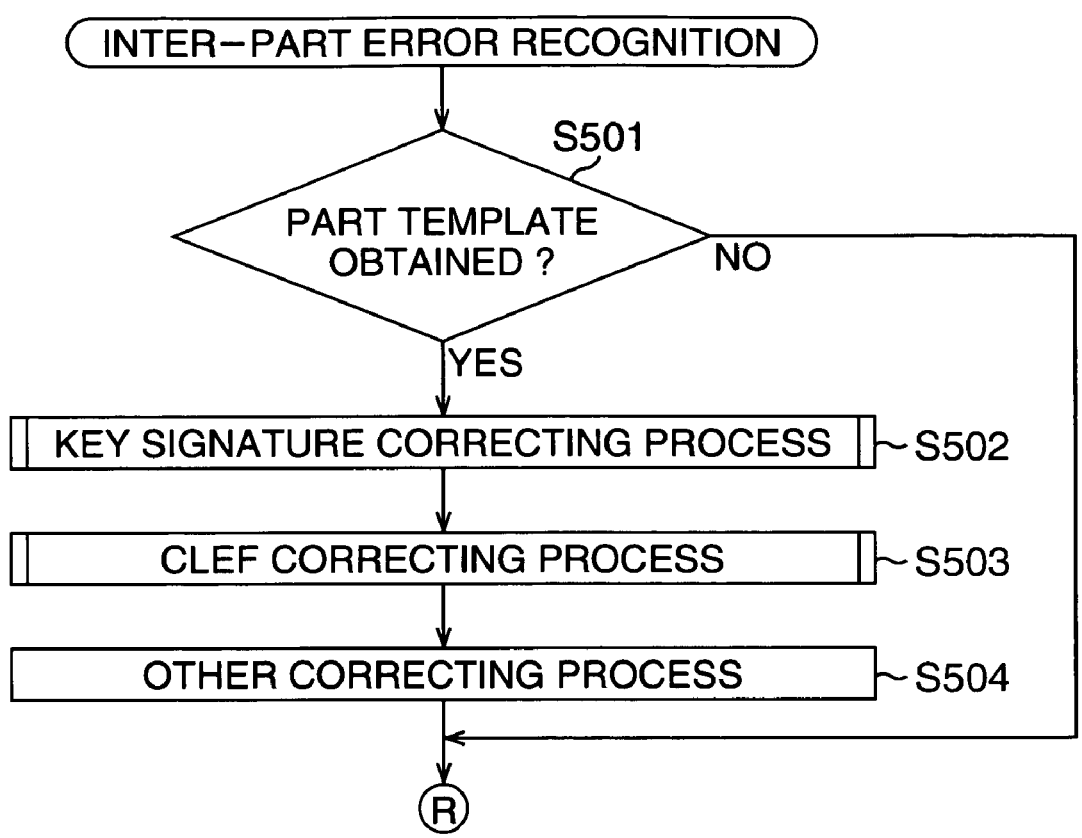
FIG. 12 is a flowchart explaining one example of an inter-part error recognition correcting process at Step S22 in FIG. 2B according to the embodiment of the present invention.

One example of the inter-part error recognition correcting process at Step S22 in FIG. 2B is explained referring to a flowchart in FIG. 12.

At Step S501, the CPU 1 judges whether or not the part template 301 (information thereof) can be obtained in the flowchart in FIG. 5. As a result of the judgement, when the part template 301 can not be obtained, it returns to Step S23 in FIG. 2B.

On the other hand, when the part template 301 can be obtained, the CPU 1 proceeds to Step S502, and then executes a key signature correcting process using the obtained part template 301 (information thereof). In the key signature correcting process, the CPU 1 corrects the key signature recognized at Step S15 in FIG. 2B using the part template 301 (information thereof). Note that the key signature correcting process will be described in detail later.

At Step S503, the CPU 1 executes a clef correcting process using the obtained part template 301 (information thereof). In the clef correcting process, the clef recognized at Step S13 in FIG. 2B is corrected with the part template 301 (information thereof). In the above-described clef with an octave correcting process at Step S302 (FIG. 11) in FIG. 9, a clef is corrected with information only in one part. However, in the clef correcting process at Step S503, a clef is corrected with information in plural parts. The clef correcting process at Step S503 will be described in detail later.

After proceeding to Step S504, the CPU 1 executes the inter-part error recognition correcting process except the key signature correcting process and the clef correcting process. The inter-part error recognition correcting process as described before is a process such that a portion that can not be judged as an error recognition without information of plural parts is corrected with the part template 301. And then, it returns to Step S23 in FIG. 2B.

In this embodiment as described above, performing the flowchart in FIG. 12 realizes a part of a setting unit.

Figure 13:
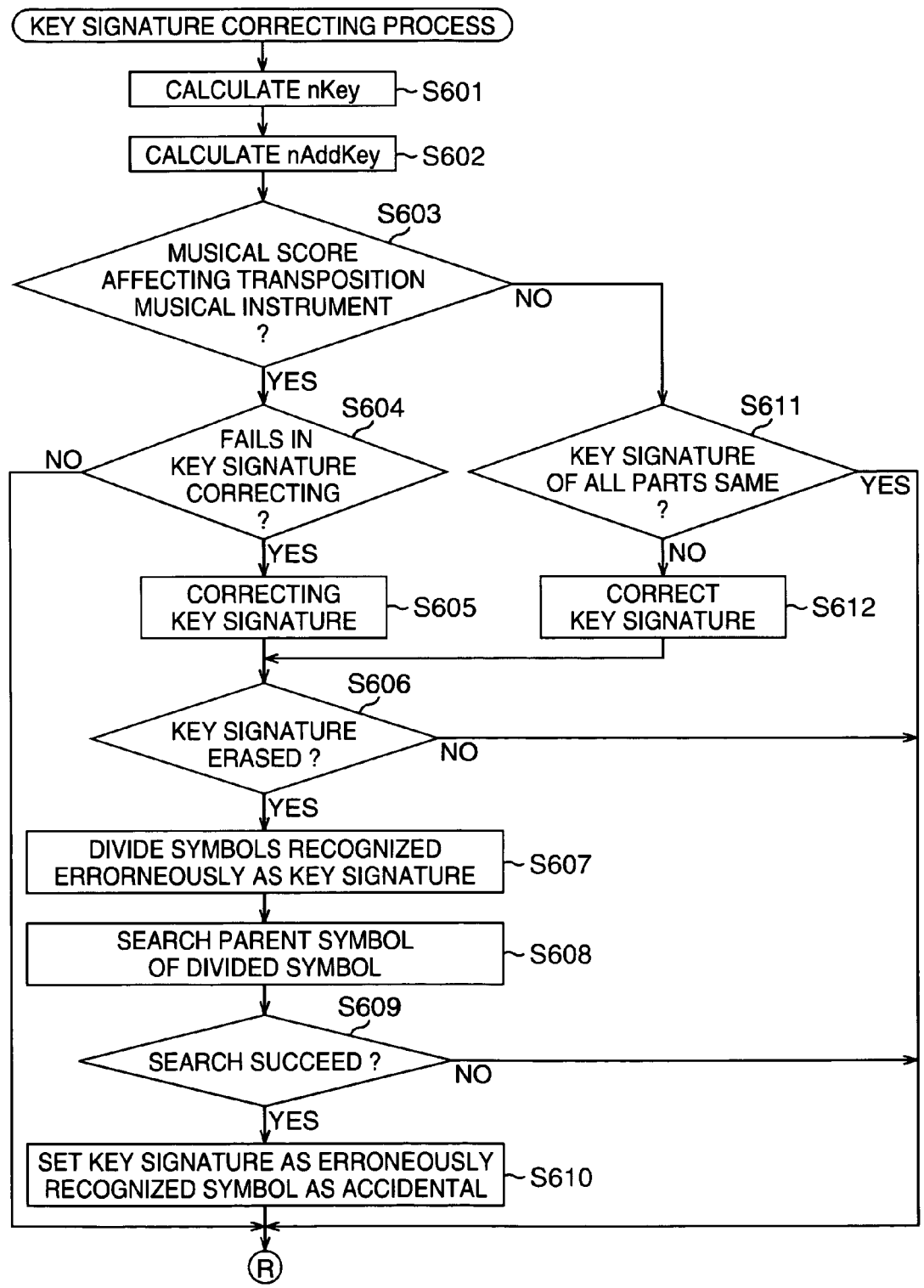
FIG. 13 is a flowchart explaining a key signature correcting process at Step S502 in FIG. 12 according to the embodiment of the present invention.

The key signature correcting process at Step S502 in FIG. 12 is explained referring to a flowchart in FIG. 13. Before starting the flowchart in FIG. 13, the CPU 1 recognizes the part of the musical score obtained at Step S1 in FIG. 2A. And then, when the recognized part is a part in which key signatures for a drum score and a rhythm score and the like do not exist, the part is not considered as the subject of the key signature correcting process. Namely, regarding to the part that is not considered as the subject of the key signature process, the process of the flowchart in FIG. 13 as will be explained hereinafter is not executed.

At Step S601, the CPU 1 calculates a transposition amount nkey for the bar in the part of the musical score obtained at Step S1 in FIG. 2A. The nkey value is a numerical value determined from a key signature ID according to a musical grammar, and positive and negative values exist. However, in this embodiment, it is only required to find out where the position is among twelve semitones. Therefore, only a positive value exists. The nkey can be calculated by an equation, however, in this embodiment, it is obtained from a table shown in FIG. 14 such that the table as shown in FIG. 14 is stored in the HDD 4 beforehand and then the number of "Flats and Sharps" calculated from the key signature ID (absolute value of nkeyNum) are set as a key.

At Step S602, the CPU 1 calculates a transposition amount nAddKey considering a transposition musical instrument for the bar in the part of the musical score obtained at Step S1 in FIG. 2A with Equation (1) as below.

$$n\text{AddKey} = (n\text{InstKey} + n\text{Key} + 96) \bmod 12 \quad (1)$$

In Equation (1), mod indicates that a remainder is calculated. Regarding nAddkey as well, in this embodiment, it is only required to find out where the position is among twelve semitones. As shown in Equation (1), a remainder is obtained after adding sufficient enough amount that the obtained value becomes positive (96 in Equation (1)). As a result of the calculation of Equation (1), in the case when nAddKey becomes a negative value, add 12 to (nInstKey+nKey+96) until nAddkey becomes a positive value, and then a remainder is obtained. In Equation (1), nIndtKey is a content of the transposition musical instrument setting 305 included in the part template 301 obtained at Step S107 in FIG. 5.

FIG. 15 and FIG. 16 are views showing concrete examples of nkey and nAddKey calculated as above.

At Step S603, the CPU 1 judges whether or not the musical score obtained at Step S1 in FIG. 2A is a musical score affecting a transposition musical instrument. One example of a method judging whether or not the musical score obtained at Step S1 in FIG. 2A is a musical score affecting a transposition musical instrument is explained referring FIG. 15 and FIG. 16.

At first, the CPU 1 refers to the nKey value every bar, and then calculates nElseNum, which is the number of nKey except nKey having a same value.

In Bar 1 of the example shown in FIG. 15, nKey value are 0, 10, and 7, which are all different. Accordingly, the number of nKey except nKey having a same value, nElseNum is 2. In Bar 2 of the example shown in FIG. 15, nKey values are 2, 0, and 9, which are all different. Accordingly, the number of nKey except nKey having a same value, nElseNum is 2.

On the other hand, in Bar 1 of the example shown in FIG. 16, nKey values are 0, 0, and 7. Accordingly, the number of nKey except nKey having a same value (=0), nElseNum is 1. In Bar 2 of the example shown in FIG. 16, nKey values are 2, 0, and 9, which are all different. Accordingly, the number of nKey except nKey having a same number, nElseNum is 2.

The CPU 1 refers to nAddKey value every bar, and calculates nElseNum, which is the number of nKey except nKey having a same value.

In Bar 1 of the example shown in FIG. 15, nAddKey values are 10, 10, and 10, which are all same. Accordingly, the number of nAddKey except nAddKey having a same value, nElseNum is 0. In Bar 2 of the example shown in FIG. 15, nAddKey values are 0, 0, and 0, which are all same. Accordingly, the number of nAddKey except nAddKey having a same value, nElseNum is 0.

On the other hand, in Bar 1 of the example shown in FIG. 16, nAddKey values are 10, 0, and 10. Accordingly, the number of nKey except nkey having a same value (=10), nElseNum is 1. In Bar 2 of the example shown in FIG. 16, nAddKey values are 0, 0, and 0, which are all same. Accordingly, the number of nAddKey except nAddKey having a same value, nElseNum is 0.

The CPU 1 adds nElseNum calculated for nkey of the bar, and adds nElseNum calculated for nAddKey of the bar. And then, for example, when the additional value of nElseNum calculated for nKey is larger than the additional value of nElseNum calculated for nAddKey, the CPU 1 judges the musical score obtained at Step S1 in FIG. 2A as a musical score affecting an transposition musical instrument, otherwise, the musical score obtained at Step S1 in FIG. 2A as not a musical score affecting a transposition musical instrument.

In the example shown in FIG. 15, the additional value of nElseNum calculated for nKey is 4 (=2+2), and the additional value of nElseNum calculated for nAddKey is 0. Therefore, the musical score obtained at Step S1 in FIG. 2A is judged as the musical score affecting a transposition musical instrument. Similarly, in the example shown in FIG. 16, the additional value of nElseNum calculated for nKey is 3 (=1+2), and the additional value of nElseNum calculated for nAddKey is 1 (=1+0). Consequently, the musical score obtained at Step S1 in FIG. 2A is judged as the musical score affecting a transposition musical instrument.

In this embodiment as above, nElseNum (additional value thereof) calculated from nKey, whose value becomes large in case of the musical score affecting transposition musical instrument, and nElseNum (additional value thereof) calculated from nAddKey, whose value becomes small in case of the musical score affecting a transposition musical instrument, are compared. After that, it is to be judged whether or not the musical score obtained at Step S1 in FIG. 2A is a musical score affecting a transposition musical instrument.

As a result of the judgement at Step S603 as above, when the musical score obtained at Step S1 in FIG. 2A is not the musical score affecting a transposition musical instrument, it proceeds to Step S611 as will be described later. On the other hand, when the musical score obtained at Step S1 in FIG. 2A is the musical score affecting a transposition musical instrument, it proceeds to Step S604.

After proceeding to Step S604, the CPU 1 judges whether or not a key signature recognition fails. Herein, one example of a method judging whether or not the key signature recognition fails is explained referring to FIG. 15 and FIG. 16.

The CPU 1 refers to nkey or nAddKey every bar, which is used to obtain a smaller additional value out of the additional value of nElseNum calculated for nkey and the additional value of nElseNum calculated for nAddkey, and then when these values of nKey or nAddKey are all same, it judges that the key signature recognition succeeds, otherwise, it judges that the key signature recognition fails.

In the example shown in FIG. 15, the additional value of nElseNum calculated for nAddKey (=0) is smaller than the additional value of nElseNum calculated for nKey (=4). And the nAddkey values used to obtain the additional value of nElseNum calculated for nAddKey (=0) are all same (=10, 0) in Bar 1 and Bar 2, as well. Accordingly, it is judged that the key signature recognition succeeds.

On the other hand, in the example shown in FIG. 16, the additional value of nElseNum calculated for nAddKey (=1) is smaller than the additional value of nElseNum calculated for nkey (=3). And the nAddKey values used to obtain the additional value of nElseNum calculated for nAddKey (=1) are all same (=0) in Bar 2, however, only one nAddKey value in Bar 1 is 0, which is different from other values (=10). Accordingly, it is judged that the key signature recognition fails in Bar 1 of a trombone.

As a result of the judgement at Step S604 as above, when it is judged that the key signature recognition does not fail, or (it succeeds), it returns to Step S503 in FIG. 12. On the other hand, when it is judged that the key signature recognition fails, it proceeds to Step S605.

After proceeding to Step S605, the CPU 1 corrects the key signature judged that the recognition fails at Step S604. Herein, one example of a method correcting a key signature is explained referring to FIG. 16.

The CPU 1 calculates a new nKey value with Equation (3) as below in the bar so that the nAddKey value in the part where the key signature recognition fails becomes the same as other values.

$$n\text{Key}=(S-n\text{InstKey}) \bmod 12 \tag{3}$$

In Equation (3) as well, mod indicates that a remainder is calculated. S is the nAddKey value in a part different from the part where the key signature recognition fails.

In the example shown in FIG. 16, in Bar 1, the nAddKey value S in parts (trumpet, alto saxophone) different from the part where the key signature recognition fails (trombone) is 10. Accordingly, the new nKey value is 10. And then, a kind of key signature to modulate is determined based on the numerical value (=10). A key signature, of which nKey value at the table shown in FIG. 14 is the same as the numerical value is a key signature to modulate. For example, in case of the new nKey value being 10, according to the table in FIG. 14, the key signature to modulate is determined as two flats. Note that there is a case that the nKey value corresponding to the number of sharps and the nKey value corresponding to the number of flats are same at the table in FIG. 14. In such a case, either a sharp or a flat is to be selected as a key signature to modulate based on other information.

And the CPU 1 corrects based on at least one of the following: the content of a part different from the part where the key signature recognition fails (key signature and the like); the content of other bars of the part where the key signature recognition fails (key signature and the like); the content of other bars of the part where the key signature recognition succeeds (key signature and the like); the content of the second best ID at the arranged position of the key signature of which the recognition fails; a state of a natural positioned before the key signature which fails the recognition (at least either one of a natural in the bar where the key signature that fails the recognition belongs and a natural in a bar before from the bar where the key signature which fails the recognition belongs); and a state of a natural in a bar after from the bar where the key signature which fails the recognition belongs.

According to the example shown in FIG. 16, in case of an old nKey being 0, and a new nKey being except 0, a key signature is to be added. Further, in case of an old nKey being except 0 and a new nKey being except 0, a key signature is to be changed. Further, in case of an old nKey being except 0 and a new nKey being 0, a recognized key signature is to be deleted.

At Step S606, the CPU 1 judges whether or not a key signature is deleted at Step S605. As a result of the judgement, when the key signature is not deleted, it returns to Step S503. On the other hand, when the key signature is deleted, it judges that it is highly possible that the key signature that fails in a recognition is an accidental, and proceeds to Step S607.

After proceeding to Step S607, the CPU 1 divides the music symbols, which are recognized erroneously as the key signatures (deleted key signatures) into the respective music symbols.

At Step S608, the CPU 1 searches the music symbol (a note and the like) to be a parent of the music symbol obtained at Step S607. At that time, it makes a threshold value (distance), which is to judge the music symbol as an accidental of the music symbol (a note and the like) to be a parent, small, and then searches the music symbol to be a parent (a note and the like) of the music symbol.

At Step S609, the CPU 1 judges whether or not the music symbol (a note and the like) to be a parent of the music symbol obtained at Step S607 is searched. As a result of the judgement, when the music symbol (a note and the like) to be a parent of the music symbol can not be searched, the CPU 1 returns to Step S503. On the other hand, when the music symbol (a note and the like) to be a parent of the music symbol can be searched, the CPU 1 proceeds to Step S610.

After proceeding to Step S610, the CPU 1 sets the symbol recognized erroneously as the key signature (the deleted key signature) as an accidental. And then, it returns to Step S503 in FIG. 12.

At Step S603, the CPU 1 proceeds to Step S611 when it is judged that the musical score obtained at Step S1 in FIG. 2A is not the musical score affecting a transposition musical instrument.

After proceeding to Step S611, it judges whether or not the key signature of all the parts in the bar is same. As a result of the judgement, when the key signature of all the parts is same, it returns to Step S503. On the other hand, when the key signature of all the parts is not same, it proceeds to Step S612.

After proceeding to Step S612, the CPU 1 corrects the key signature so that the key signature of all the parts becomes same. Concretely, in the bar, the CPU 1 corrects the key signature of the part of which nKey value is different to the key signature of the plural parts of which nKey value is same. And then, it proceeds to Step S606 as described previously.

Figure 17:
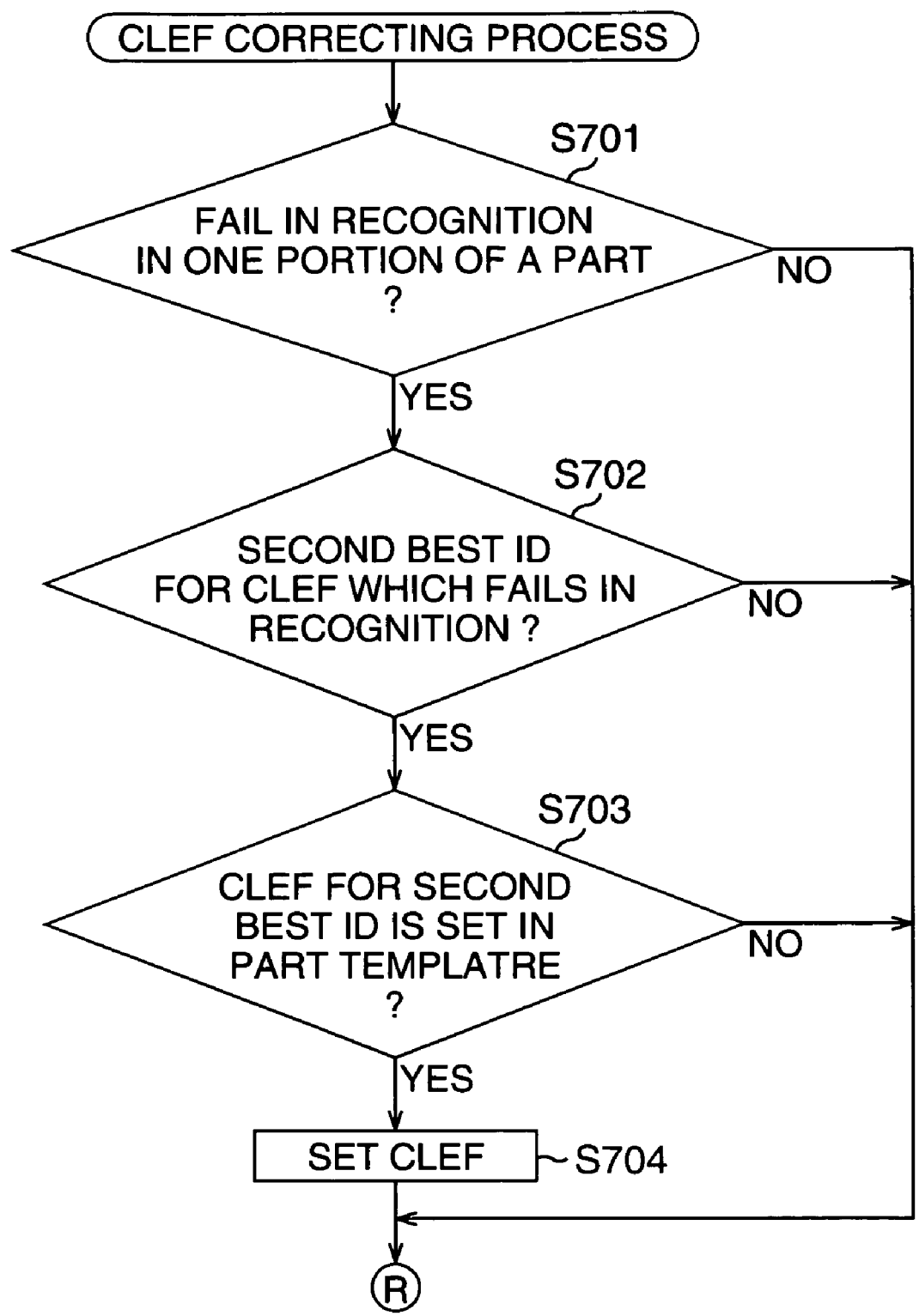
FIG. 17 is a flowchart explaining a clef correcting process at Step S503 in FIG. 12 according to the embodiment of the present invention.

The clef correcting process at Step S503 in FIG. 12 is explained referring to a flowchart in FIG. 17.

At Step S701, the CPU 1 judges whether or not the clef recognition fails in a portion of a part of the musical score obtained at Step S1 (namely, it judges whether or not a clef different from other part exists in a portion of a part, and the clef does not exist). As a result of the judgement, when the clef recognition does not fail, the CPU 1 returns to Step S504. On the other hand, when the clef recognition fails, the CPU 1 proceeds to Step S702.

After proceeding to Step S702, the CPU 1 judges whether or not the second best ID 405 to the clef that fails in the recognition at Step S701 is stored. As a result of the judgement, when the second best ID 405 to the clef that fails in the recognition is not stored, it returns to Step S504 in FIG. 12.

On the other hand, when the second best ID 405 to the clef that fails in the recognition is stored, it proceeds to Step S703.

After proceeding to Step S703, the CPU 1 judges whether or not the clef corresponding to the second best ID 405 judged as to be stored at Step S702 and the clef 306 of the part template 301 obtained at Step S107 in FIG. 5 coincide with each other. As a result of the judgement, when the clefs do not coincide, it returns to Step S504 in FIG. 12. On the other hand, when the clefs coincide, it proceeds to Step S704.

After proceeding to Step S704, the CPU 1 changes the clef that fails in the recognition to the clef 306 of the part template 301. And then, it returns to Step S504 in FIG. 12.

At Step S702, in FIG. 17, when it is judged that the second best ID 405 to the clef that fails in the recognition at Step S701 is not stored, the process of the flowchart in the FIG. 17 is to be terminated. However, it is not always necessary to do in this manner. For example, when it is judged that the second best ID 405 to the clef that fails in the recognition at Step S701 is not stored, it judges whether or not the third best ID 406 to the clef is stored. As a result of the judgement, when the third best ID 406 is not stored, the process of the flowchart in FIG. 17 is to be terminated. On the other hand, when the third best ID 406 is stored, it judges whether or not the clef corresponding to the third best ID 406 and the clef 306 of the part template 301 obtained at Step S107 in FIG. 5 coincide. And the when they coincide, it proceeds to Step S704, otherwise, the process of the flowchart in FIG. 17 can be terminated.

At Step S701 in FIG. 17, when the second best ID 405 to the clef that fails in the recognition is stored, the clef is to be corrected, however, it is not always necessary to do in this manner. Regardless of the second best ID 405, the clef can be changed forcibly at all the paragraphs. In this manner, at least the process at Step S702 in FIG. 17 is to be unnecessary In order to execute more proper correction of the key signature, in addition to the second best ID, it can be judged whether or not correcting the key signature is performed using the clef that succeeds in the recognition. The process of the flowchart in FIG. 17 can be performed as follows. For example, After Step S702, in FIG. 17, another clef that succeeds in the recognition is referred, and then it is judged whether or not the referred clef is the one that corresponds to the second best ID 405 to the clef that fails in the recognition. As a result of the judgement, when the referred clef is the one that corresponds to the second best ID 405 to the clef that fails in the recognition, Step S703 is executed, otherwise, the process of the flowchart in FIG. 17 is terminated.

In this embodiment as above, it is configured as follows, the part template 301 including information that is necessary to set after the image of the musical score read out by the scanner 11 is recognized, is stored beforehand. And the part template 301 corresponding to the read out musical score by the scanner 11, is selected from a plurality of the part templates. And then, with the selected part template, setting (correcting) is to be performed automatically for the musical score read out by the scanner 11. Consequently, it makes it possible to decrease the settings that the user performs after the musical score is recognized, and increase the recognition rate of the musical score rather than conventionally.

In this embodiment, the cases that a key signature and a clef are set (corrected) for the recognition result of the musical score based on information of the part template 301 are explained according to the examples, however, as described before, setting (correcting) for the recognition result of the musical score is not limited to the key signature and the clef. For example, in the case when information regarding a tone is included in the part template 301, the tone included in the part template 301 obtained at Step S107 in FIG. 5 can be set for the musical score obtained at Step S1 in FIG. 2A depending on circumstance (for example, base on the user's operation).

In the case when fewer number of the staff lines than the number of the staff lines recognized at Step S5 FIG. 2A is set for the part template 301, it is possible to judge effectiveness of the line recognized at Step S5 again based on the ratio of the number of dots and the like, and change the number of the staff lines to the number of the staff lines set for the part template 301. On the other hand, in the case when more number of the staff lines than the number of the staff lines recognized at Step S5 is set, it is possible to judge again whether or not the lines exists on upper and lower suitable positions of the staff lines recognized at Step S5, and change the number of the staff lines to the number of the staff lines set for the part template 301.

At least a part of the in-part recognition correcting process at Step S17, FIG. 2B (FIG. 9) and at least a part of the inter-part recognition correcting process at Step S22 in FIG. 2B (FIG. 12) can not be performed depending on circumstance (based on the user's operation).

At Step S605 of the key signature correcting process, at Step S502, in FIG. 12, at a stage when the information indicated in FIG. 15 and FIG. 16 is obtained, there occur a case actually that is capable of judging a key signature in a bar as an accidental. For example, nKey and nAddKey are same in approximately all the bars, and nElseNum is a large case only in a portion of the bar. In such a case, the key signature can be set as an accidental again without performing the process explained at Step S605.

According to the present invention, a part template including setting information to need to set for the musical score after the musical score is recognized is stored beforehand. And a part template corresponding to the read out musical score is obtained from the ones stored beforehand, and setting for the musical score can be performed automatically using the obtained template. Accordingly, it is possible to make the settings, which the user performs after a musical score is recognized, fewer than conventionally.

Further, correcting the recognition result of the musical score automatically with the obtained template makes it possible to increase the recognition rate of the musical score higher than conventionally.

The present embodiments of the invention, as explained above, can be realized by which a computer executes a program. Units to supply a program to a computer, for example, a computer readable storage medium such as a CD-ROM to record such program or a transmission medium to transmit such program are applied to the embodiments of the present invention. And a program product such as a computer readable storage medium to store the above-described program can be applied to the embodiment of the present invention. Above-described program, a computer readable storage medium, a transmission medium, and a program product are included in the category.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A musical score recognition device, comprising:
   a first obtaining unit obtaining an image including information of a paper based musical score by an image readable unit;
   a recognizing unit recognizing the musical score including the image obtained by said first obtaining unit;
   a storing unit storing a part template including setting information to need to set for the musical score after recognized;
   a second obtaining unit obtaining a part template corresponding to the musical score included in the image read out by the readable unit from a part template stored in said storing unit; and
   a setting unit setting automatically for the musical score included in the image read out by the readable unit using the template obtained by said second obtaining unit,
   wherein the part template includes: part template identification information to identify the part template; transposition musical instrument setting information regarding a transposition musical instrument as an application subject of the part template; clef information regarding a clef as an application subject of the part template; and tablature information regarding a tablature as an application subject of the part template.

2. The musical score recognition device according to claim 1, wherein
   said storing unit stores the part template beforehand corresponding to a musical instrument ID to identify a means for performance; and
   said second obtaining unit distinguishes the musical instrument ID for the part of the musical score based on the part name obtained by which at least a portion of the musical score is recognized by said recognizing unit and obtains the template corresponding to the distinguished musical instrument ID every part of the musical score.

3. The musical score recognition device according to claim 1, further comprising:
   a display unit displaying information indicating the part template obtained by said second obtaining unit every part of the musical score;
   an accepting unit accepting at least one change of the part template obtained by said second obtaining unit based on a user's operation for information indicating the part template displayed by said display unit; and wherein
   said storing unit updates the part template accepted by said accepting unit based on the user' operation; and
   said display unit displays information indicating updated part template instead of information indicating the part template obtained by said second obtaining unit when the part template updated by said storing unit.

4. The musical score recognition device according to claim 3, further comprising:
   a restricting unit restricting update by said storing unit of the part template accepted by said accepting unit, and wherein
   said storing unit updates the part template whose change is not restricted by said restricting unit based on the user's operation.

5. The musical score recognition device according to claim 4, wherein
   said restricting unit restricts update on the part template of which an MIDI program number changes by update.

6. The musical score recognition device according to claim 1, wherein
   said setting unit corrects a recognition result of the musical score by said recognizing unit using the part template obtained by said second obtaining unit.

7. The musical score recognition device according to claim 6, wherein
   said setting unit executes a correcting process of the recognition result of the musical score by said recognizing unit with information of one part of the musical score recognized by said recognizing unit, and executes a correcting process of the recognition result of the musical score by said recognizing unit with information of plural parts of the musical score recognized by said recognizing unit separately.

8. A computer-readable medium for storing a program for executing:

a first obtaining step obtaining an image including information of a paper based musical score by image readable unit;

a recognizing step recognizing the musical score included in the image obtained by said obtaining step;

a storing step storing a part template including setting information to need to set for the music score after the musical score recognized in a storing medium;

a second obtaining step obtaining the part template corresponding to a musical score included in an image read out by a readable step from the part template stored by said storing step; and a setting step setting a setting for the music score included in the image read out by the readable step using the part template obtained by said second step, wherein the part template includes: part template identification information to identify the part template: transposition musical instrument setting information regarding a transposition musical instrument as an application subject of the part template; clef information regarding a clef as an application subject of the part template; and tablature information regarding a tablature as an application subject of the part template.

9. A musical score recognition device, comprising:

a first obtaining unit obtaining an image including information of a paper based musical score by an image readable unit;

a recognizing unit recognizing the musical score including the image obtained by said first obtaining unit;

a storing unit storing a part template including setting information to need to set for the musical score after recognized;

a second obtaining unit obtaining a part template corresponding to the musical score included in the image read out by the readable unit from a part template stored in said storing unit;

a setting unit setting automatically for the musical score included in the image read out by the readable unit using the template obtained by said second obtaining unit, a display unit displaying information indicating the part template obtained by said second obtaining unit every part of the musical score;

an accepting unit accepting at least one change of the part template obtained by said second obtaining unit based on a user's operation for information indicating the part template displayed by said display unit; and wherein said storing unit updates the part template accepted by said accepting unit based on the user' operation; and said display unit displays information indicating updated part template instead of information indicating the part template obtained by said second obtaining unit when the part template updated by said storing unit.

10. The musical score recognition device according to claim 9, further comprising:

a restricting unit restricting update by said storing unit of the part template accepted by said accepting unit, and wherein said storing unit updates the part template whose change is not restricted by said restricting unit based on the user's operation.

11. The musical score recognition device according to claim 10, wherein said restricting unit restricts update on the part template of which an MIDI program number changes by update.

* * * * *